United States Patent
Bjorke et al.

(10) Patent No.: US 10,030,979 B2
(45) Date of Patent: Jul. 24, 2018

(54) DETERMINING AND/OR GENERATING A NAVIGATION PATH THROUGH A CAPTURED THREE-DIMENSIONAL MODEL RENDERED ON A DEVICE

(71) Applicant: Matterport, Inc., Mountain View, CA (US)

(72) Inventors: Kevin Allen Bjorke, Santa Clara, CA (US); Matthew Tschudy Bell, Palo Alto, CA (US)

(73) Assignee: Matterport, Inc., Mountain View, CA (US)

( * ) Notice: Subject to any disclaimer, the term of this patent is extended or adjusted under 35 U.S.C. 154(b) by 5 days.

(21) Appl. No.: 15/224,000

(22) Filed: Jul. 29, 2016

(65) Prior Publication Data
US 2018/0143023 A1    May 24, 2018

(51) Int. Cl.
*G01C 21/20* (2006.01)
*G06T 19/00* (2011.01)

(52) U.S. Cl.
CPC .......... *G01C 21/206* (2013.01); *G06T 19/003* (2013.01)

(58) Field of Classification Search
CPC .................................................. G01C 21/206
USPC ........................................................ 701/428
See application file for complete search history.

(56) References Cited

U.S. PATENT DOCUMENTS

| 7,933,395 B1* | 4/2011 | Bailly | G06F 3/04815 379/201.04 |
| 8,751,156 B2* | 6/2014 | Musabji | G01C 21/3638 701/428 |
| 8,880,336 B2* | 11/2014 | van Os | G01C 21/3635 345/173 |
| 2017/0273048 A1* | 9/2017 | Huang | G01C 21/206 |

OTHER PUBLICATIONS

"IMoon: Using Smartphones for Image-based Indoor Navigation"; Dong, Jiang et al., SenSys '15 Proceedings of the 13th ACM Conference on Embedded Networked Sensor Systems, pp. 85-97, ACM New York, NY.*

* cited by examiner

*Primary Examiner* — Brian P Sweeney
(74) *Attorney, Agent, or Firm* — Amin, Turocy & Watson, LLP

(57) ABSTRACT

Systems and techniques for determining and/or generating a navigation path through a three-dimensional (3D) model are presented. At least one waypoint location within a captured 3D model of an architectural environment is determined. A path within the captured 3D model, to navigate between a first location associated with the captured 3D model and a second location associated with the captured 3D model, is determined based on the at least one waypoint location. Visual data indicative of 2D data or 3D data of the captured 3D model along the path is transmitted to a remote client device to simulate navigation of the path within the captured 3D model between the first location and the second location.

20 Claims, 16 Drawing Sheets

DETERMINING AND/OR GENERATING A NAVIGATION PATH THROUGH A CAPTURED THREE-DIMENSIONAL MODEL RENDERED ON A DEVICE

TECHNICAL FIELD

This disclosure relates generally to three-dimensional (3D) modeling, and more specifically, to determining and/or generating a navigation path through a captured 3D model.

BACKGROUND

Digital three-dimensional (3D) models can be generated based on scans of architectural spaces (e.g., houses, construction sites, office spaces, etc). In certain instances, a 3D model of an architectural space can be navigated by a user via a user interface on a device. However, navigating through a 3D model (e.g., navigating to a distant location in a 3D model, navigating through a 3D model of a multistory residence, etc.) via a user interface on a device is generally difficult.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a waypoint location component, a path component and an output component. The waypoint location component determines at least one waypoint location within a captured three-dimensional (3D) model of an architectural environment or another environment. The waypoint location component determines view data for the at least one waypoint location that is indicative of a view from the at least one waypoint location. The path component determines a path within the captured 3D model to navigate between a first location associated with the captured 3D model and a second location associated with the captured 3D model based on the at least one waypoint location. The output component transmits, to a remote client device, visual data indicative of two-dimensional (2D) data or 3D data of the captured 3D model along the path to simulate navigation of the path within the captured 3D model between the first location and the second location.

Additionally, a non-limiting implementation provides for determining a waypoint location within a three-dimensional (3D) model of an architectural environment and view data for the waypoint location that is indicative of a view from the waypoint location, determining a navigation path through the 3D model that includes the waypoint location to navigate between a first location within the 3D model and a second location within the 3D model, and transmitting, to a remote client device, visual data indicative of two-dimensional (2D) data or 3D data of the 3D model along the navigation path to facilitate a rendering of the navigation path through the 3D model. In an embodiment, the visual data can be rendered by the remote client device.

In accordance with another implementation, a computer readable storage device includes instructions that, in response to execution, cause a system that includes a processor to perform operations, including: determining a first location within a three-dimensional (3D) model of an architectural environment and view data for the first location that is indicative of a view from the first location, determining a navigation path between a second location within the 3D model and a third location within the 3D model, the navigation path comprising the first location, the second location and the third location, and transmitting data associated with the navigation path to a remote client device.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects and implementations of the present innovation will be apparent upon consideration of the following detailed description, taken in conjunction with the accompanying drawings, in which like reference characters refer to like parts throughout, and in which.

DETAILED DESCRIPTION

Figure 1:
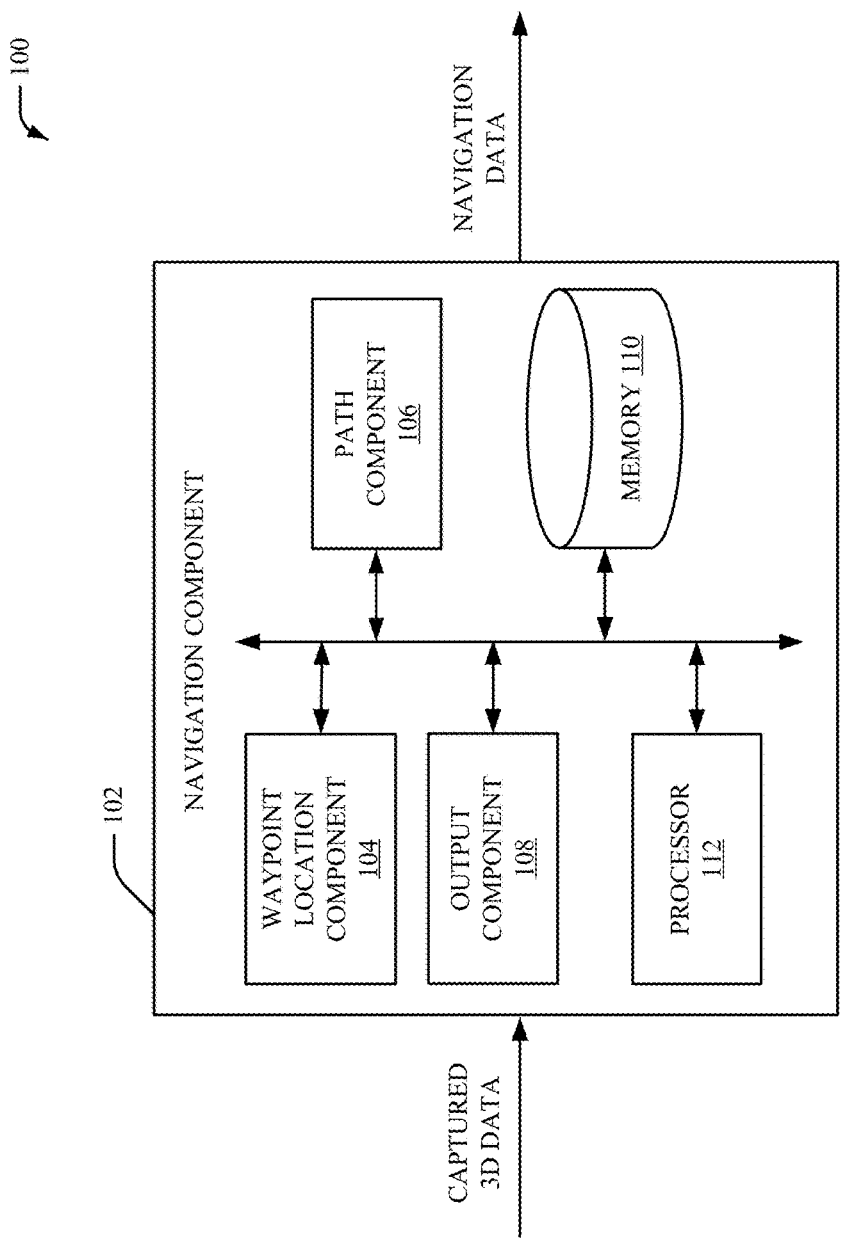
FIG. 1 illustrates a high-level block diagram of an example navigation component for determining and/or generating a navigation path through a three-dimensional (3D) model, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Techniques for determining and/or generating a navigation path through a 3D model (e.g., 3D-reconstructed model) and/or 3D scenes of a 3D model are presented herein. The 3D model can be a captured 3D model. Determining and/or generating the navigation path can be performed in connection with a 3D reconstruction system that can facilitate automatic and/or semi-automatic generation of 3D models of real-world locations (e.g., houses, apartments, construction sites, office spaces, commercial spaces, other living spaces, other working spaces, etc.). A 3D reconstruction system can employ two-dimensional (2D) image data and/or depth data captured from 3D sensors (e.g., laser scanners, structured light systems, time-of-flight systems, etc.) associated with a 3D capturing device to generate the 3D data (e.g., the 3D-reconstructed data) and/or the 3D model. For example, the 2D image data and/or the depth data can be captured from the 3D sensors by scanning a real-world location (e.g., moving a 3D capturing device with the 3D sensors in a scanning motion to capture the 2D image data and/or the depth data). Therefore, the navigation path can be a path through a 3D space reconstructed via the 3D reconstruction system.

In an aspect, a navigation path through a 3D model can include one or more waypoint locations. A waypoint location can be a location on the navigation path where a virtual camera view of a 3D model (e.g., a virtual camera that renders a view of the 3D model on a remote client device) stops during simulation of the navigation path through the 3D model. A navigation path through a 3D model and/or a waypoint location for the navigation path can be automatically determined based on analysis of 3D data and/or the 3D model that represents a 3D space of the real-world location. In one example, a waypoint location for a navigation path through a 3D model can be determined based on scanning locations associated with a 3D reconstruction system and/or views from the scanning locations. In an embodiment, a capture process associated with the 3D reconstruction system can provide 2D imagery. Locations of the 2D imagery can be employed as a start location, an end location, and/or one or more waypoint locations for the navigation path. In one example, the capture process associated with the 3D reconstruction system can provide panoramic 2D imagery (e.g., projected 360-degree panorama photographic images). Therefore, a waypoint location can be associated with 2D imagery and/or panoramic 2D imagery. Moreover, 2D imagery and/or panoramic 2D imagery can be employed to select a waypoint location. Additionally or alternatively, a navigation path through a 3D model and/or a waypoint location for the navigation path can be defined based on user feedback data (e.g., a portion of the navigation path can be defined by a user identity associated with the 3D model). Therefore, compared to a conventional 3D model where a viewer navigates the 3D model without guidance, the subject innovation provides for a 3D model where a viewer can experience defined locations of the 3D model and/or a sequence of defined locations as a tour of the 3D model. In certain implementations, a navigation path can be displayed within a 3D model as a visually guided path. Furthermore, a virtual camera view of a 3D model can be guided and/or moved along a navigation path through the 3D model. A navigation path through a 3D model can guide viewers through a 3D space of the 3D model in a naturalistic manner using a visual interface. As such, a viewing experience of a 3D model by a user on a device can be improved. Navigation through a 3D model by a user on a device can also be improved. Moreover, an amount of 3D data for a 3D model that is rendered on a remote client device (e.g., a number of panoramas views, etc.) can be reduced and/or optimized.

Referring initially to FIG. 1, there is illustrated a system 100 that facilitates navigation through a 3D model of an architectural environment or another environment, according to an aspect of the subject disclosure. In one example, the system 100 can be implemented on or in connection with at least one server associated with 3D data (e.g., 3D-reconstructed data). The system 100 can be employed by various systems, such as, but not limited to, 3D modeling systems, 3D reconstruction systems, server systems, cloud-based systems, client-side systems, and the like. The system 100 can include a navigation component 102 that can include a waypoint location component 104, a path component 106 and/or an output component 108. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 can include memory 110 for storing computer executable components and instructions. The system 100 can further include a processor 112 to facilitate operation of the instructions (e.g., computer executable components and instructions) by the system 100.

The navigation component 102 (e.g., with the waypoint location component 104) can receive captured 3D data (e.g., CAPTURED 3D DATA shown in FIG. 1). The captured 3D data can be captured 3D-reconstructed data. In one example, the captured 3D data can be raw 3D-reconstructed data. In another example, the captured 3D data can be processed and/or segmented 3D-reconstructed data. In an aspect, the captured 3D data can be generated (e.g., captured) via at least one 3D reconstruction system. For example, the at least one 3D reconstruction system can employ 2D image data and/or depth data captured from one or more 3D sensors (e.g., laser scanners, structured light systems, time-of-flight systems, etc.) to automatically and/or semi-automatically generate a 3D model (e.g., a captured 3D model) of an architectural environment (e.g., architectural spaces, architectural structures, physical objects, . . . ). The architectural environment can be associated with an interior environment (e.g., an interior architectural environment) and/or an exterior environment (e.g., an exterior architectural environment). The one or more 3D sensors can be implemented on a 3D capturing device such as a camera (e.g., a RGB-D camera that captures RGB color data and depth data, etc.) with one or more 3D sensors or a mobile device (e.g., a smartphone) with one or more 3D sensors. In one embodiment, the one or more 3D sensors can be implemented on a camera (e.g., a RGB-D camera, etc.) to capture (e.g., simultaneously capture) texture data and geometric data associated with the architectural environment (e.g., the interior environment and/or the exterior environment). In another embodiment, the one or more 3D sensors can be implemented on a mobile device (e.g., a smartphone, etc.) to capture texture data and geometric data associated with the architectural environment (e.g., the interior environment and/or the exterior environment). In an aspect, the 2D image data and/or the depth data captured from the one or more 3D sensors can be associated with one or more capture points (e.g., one or more determined viewpoints). For example, a capture point can correspond to a position (e.g., a location) within a 3D model (e.g., a captured 3D model) generated based on the 2D image data and/or the depth data.

A 3D model of an architectural environment (e.g., the captured 3D data) can comprise geometric data and/or texture data. The geometric data can comprise data points of geometry in addition to comprising texture coordinates associated with the data points of geometry (e.g., texture coordinates that indicate how to apply texture data to geometric data). For example, a 3D model of an architectural environment (e.g., the captured 3D data) can comprise mesh data (e.g., a triangle mesh, a quad mesh, a parametric mesh, etc.), one or more texture-mapped meshes (e.g., one or more texture-mapped polygonal meshes, etc.), a point cloud, a set of point clouds, surfels and/or other data constructed by employing one or more 3D sensors. In one example, the captured 3D data can be configured in a triangle mesh format, a quad mesh format, a surfel format, a parameterized solid format, a geometric primitive format and/or another type of format. For example, each vertex of polygon in a texture-mapped mesh can include a UV coordinate for a point in a given texture (e.g., a 2D texture), where U and V are axes for the given texture. In a non-limiting example for a triangular mesh, each vertex of a triangle can include a UV coordinate for a point in a given texture. A triangle formed in the texture by the three points of the triangle (e.g., a set of three UV coordinates) can be mapped onto a mesh triangle for rendering purposes. The captured 3D data can be un-segmented captured 3D data that is not partitioned after being captured by one or more 3D sensors (e.g., the at least one 3D reconstruction system). Additionally or alternatively, captured 3D data can be segmented captured 3D data that is processed and/or partitioned after being captured by one or more 3D sensors (e.g., the at least one 3D reconstruction system).

In an aspect, 3D scene information (e.g., the captured 3D data) can be processed by a 3D scene alignment process that takes multiple 3D scenes captured from multiple points of view and produces an alignment of some or all of the 3D scenes into a common coordinate frame. In certain implementations, data from 3D sensors can be recorded with a timestamp and/or along with particular captures by a 3D capture device. When a particular 3D capture is aligned to other 3D captures, the position of data from additional sensors captured at the same or very similar time can be determined by using an aligned position of the 3D capture device when the 3D capture device obtained the particular 3D capture. This data from additional sensors can be collected over time to create a 2D map or 3D map of additional sensor readings. In another aspect, information associated with plane objects can be employed during an alignment process. A plane object can be an object that defines a plane within a 3D scene. In one example, a plane object can be a flat surface and a boundary associated with the flat surface. In another example, a plane object can be a section of a 3D model associated with a flat surface such as, for example, a floor. In an embodiment, multiple 3D scenes with plane objects that appear to match visually and/or have very similar positions and orientations can be appended together such that all of the similar plane objects become coplanar. Plane objects may be matched using 2D texture features such as a Scale-invariant feature transform (SIFT) or Speeded Up Robust Features (SURF), geometric descriptors such as known edges and corners, as well as position and orientation.

In yet another aspect, plane objects can be identified by multiple applications of RANdom SAmple Consensus (RANSAC) on 3D points in a scene which are not already assigned to a plane object. Optionally, for each plane object, 3D points along with color and any texture information from images projected onto a plane object can be employed to generate 2D texture features using SURF and SIFT methods. Boundaries and corners of an object can also be also detected. Some or all of these features can be added as information to the plane object. Plane objects within each scene can then be snapped to architectural angles such as multiples of 45 degrees. Furthermore, object planes can be merged between scenes or existing merged plane objects may be split. Methods such as RANSAC can be used to determine which plane objects should be merged into a single plane object or split apart. Combinatorial optimization techniques can also be applied, with terms based on goodness of fit of planes to be grouped together and/or terms based on the total number of groupings. Additionally, scene poses may be adjusted relative to each other to reduce adjustments needed for plane objects which have been merged with plane objects in other scenes. Plane objects can be snapped to global architectural angles based on a global coordinate system or a global plane object.

An interior environment (e.g., an indoor environment, an interior architectural environment, etc.) can include, but is not limited to, one or more rooms, one or more houses, one or more apartments, one or more office spaces, one or more construction sites, one or more commercial spaces, other living spaces, other working spaces, other environment spaces, interiors of buildings, vehicles, vessels, aircraft, subways, tunnels, crawl spaces, equipment areas, attics, cavities, etc. Furthermore, an interior environment can include physical objects included in one or more rooms, one or more houses, one or more apartments, one or more office spaces, one or more construction sites, one or more commercial spaces, other living spaces, other working spaces and/or other environment spaces. An exterior environment can include, but is not limited to, a patio, a deck, building frontage (e.g., building façade), outdoor architecture, one or more physical objects, one or more outdoor objects, etc.

The waypoint location component 104 can determine at least one waypoint location within the 3D model (e.g., the captured 3D model) of an architectural environment or another environment. A waypoint location can be a location within the 3D model where a virtual camera view of the 3D model (e.g., a virtual camera that renders a view of the 3D model on a remote client device) stops during navigation through the 3D model (e.g., during simulation of the navigation path through the 3D model). The at least one waypoint location can be a location within the 3D model that represents a physical location within an architectural environment represented by the 3D model. Additionally, the at least one waypoint location can correspond to a capture point associated with a 3D reconstruction process for the 3D model. In one example, the at least one waypoint location can correspond to a node of the 3D model. A node of the 3D model can be a position (e.g., a vertex point) relative to the 3D model. In an aspect, one or more nodes of the 3D model can be determined based on one or more pathfinding algorithms where inter-waypoint lengths are determined based on context of the 3D model. Context of the 3D model can include learning and/or understanding with respect to navigation complexities (e.g., tight turns, ascents, descents, etc.) throughout the 3D model. A pathfinding algorithm employed to determine one or more nodes along the path can include, for example, Dijkstra's algorithm associated with graph-based pathfinding, a weighted graph algorithm, a sampling algorithm that subdivides a 3D model into a set of sections, a heuristic search algorithm, and/or another type of pathfinding algorithm. A node can also be connected to one or more other nodes of the 3D model. For example, the 3D model can include a network of nodes where a node is a 3D position defined during a 3D reconstruction process performed by a 3D capturing device. The network of nodes can be an aggregate collection of potential waypoint locations associated with a 3D model and/or can comprise a set of nodes represented as a graph of locations (e.g., a disjoint graph of locations) within a 3D model. A node can also be a location where 2D imagery or panoramic 2D imagery was captured during a capture process associated with the 3D reconstruction process. As such, the waypoint location component 104 can determine the at least one waypoint location based on a network of nodes associated with the 3D model. The at least one waypoint location can be associated with view data for the at least one waypoint location that is indicative of a view from the at least one waypoint location. For example, the view data can be indicative of a defined viewpoint direction for a virtual camera and/or a defined portion of the 3D model that forms a view for a virtual camera from the at least one waypoint location. In one example, the visual data can be a set of projected 360-degree panorama photographic images embedded within a 3D mesh of the 3D model where the set of projected 360-degree panorama photographic images is projected via a virtual camera from the at least one waypoint location within the 3D model. The at least one waypoint location can additionally or alternatively be associated with scanning location data for the at least one waypoint location that is indicative of a location of a 3D capturing device that scans and/or captures 2D image data and/or depth data to form 3D data associated with the at least one waypoint location.

In an embodiment, the waypoint location component 104 can determine the at least one waypoint location based on an automated waypoint selection technique. For example, the waypoint location component 104 can determine the at least one waypoint location based on analysis of the 3D model. In an aspect, the waypoint location component 104 can determine the at least one waypoint location based on location data indicative of a location of a 3D capturing device during capture of the view data. The at least one waypoint location can be determined, for example, based on a location of a 3D capturing device when capturing 2D image data and/or depth data captured from one or more 3D sensors. In another example, the at least one waypoint location can be determined based on a location of a virtual camera within the 3D model that captures the view data from a perspective view associated with the at least one waypoint location.

In another aspect, the waypoint location component 104 can determine the at least one waypoint location based on object data indicative of an object included in the 3D model. For example, the waypoint location component 104 can identify one or more objects included in the 3D model. The one or more objects can be identified by the waypoint location component 104 via one or more automatic object-recognition algorithms. The one or more objects can be also be identified by the waypoint location component 104 by analyzing 2D panorama photography associated with the 3D model. The waypoint location component 104 can also determine a location of the one or more objects within the 3D model. Based on the location of the one or more objects within the 3D model, the waypoint location component 104 can determine the at least one waypoint location. A location of the at least one waypoint location within the 3D model can, for example, correspond to an approximate location of the one or more objects. As such, location of objects within the 3D model can trigger generation of waypoint locations by the waypoint location component 104. In one example, presence of defined objects can define a function of a room within a 3D model (e.g., if a stove is identified by the waypoint location component 104, a location within the 3D with the stove is probably a kitchen, if a bed is identified by the waypoint location component 104, a location within the 3D with the bed is probably a bedroom, etc.). In yet another aspect, the waypoint location component 104 can determine the at least one waypoint location based on spatial distances within a 3D model. For example, the waypoint location component 104 can determine the at least one waypoint location to maximize a view of a 3D space within a 3D model and/or different areas of a 3D space within a 3D model.

The waypoint location component 104 can additionally or alternatively employ semantic data to analyze the 3D model and/or determine at least one waypoint location. The semantic data can be semantic information regarding one or more objects in a scene of a 3D model, annotation tags for one or more objects in a scene of a 3D model, room names within a 3D model, points of interest within a 3D model, and/or other semantic information associated with the 3D model. Points of interest can be determined by a user identity associated with a 3D model. Alternatively, points of interest can be determined by other user input data, such as when searching for items of a known class in a retail store or warehouse, etc. The waypoint location component 104 can also employ a spatial clustering algorithm to identify groups of annotations and/or waypoint locations. In one example, the waypoint location component 104 can employ a k-means clustering technique to identify groups of annotations and/or waypoint locations within a 3D model.

Additionally or alternatively, the waypoint location component 104 can determine and/or identify the at least one waypoint location based on a room segmentation technique. For example, the at least one waypoint location can be associated with a subsection (e.g., a room) of the 3D model. In an aspect, the waypoint location component 104 can identify portions of captured 3D data that are associated with a common subsection of the 3D model (e.g., a common room). The waypoint location component 104 can implement one or more room-segmentation algorithms to determine whether portions of captured 3D data are associated with a common subsection of the 3D model (e.g., a common room). In one example, a subsection (e.g., a room, a cell, etc.) of the 3D model can be identified based on a volumetric representation of the 3D model to facilitate identifying subsections (e.g., rooms, cells, etc.) in the 3D model. Then, the waypoint location component 104 can determine a waypoint location for each subsection identified by the waypoint location component 104 and/or a portion of subsections identified by the waypoint location component 104. As such, a waypoint location determined by the waypoint location component 104 can be associated with a subsection (e.g., a room) of the 3D model.

The waypoint location component 104 can employ principles of artificial intelligence to facilitate extracting correlations and/or inferences from 3D data. The waypoint location component 104 can perform learning with respect to identifying groups of annotations and/or waypoint locations within a 3D model explicitly or implicitly. The waypoint location component 104 can also employ an automatic classification system and/or an automatic classification process to facilitate identifying groups of annotations and/or waypoint locations within a 3D model. For example, the waypoint location component 104 can employ a probabilistic and/or statistical-based analysis (e.g., factoring into the analysis utilities and costs) to learn and/or generate inferences with respect to identifying groups of annotations and/or waypoint locations within a 3D model. The waypoint location component 104 can employ, for example, a support vector machine (SVM) classifier to learn and/or generate inferences for identifying groups of annotations and/or waypoint locations within a 3D model. Additionally or alternatively, the waypoint location component 104 can employ other classification techniques associated with Bayesian networks, decision trees and/or probabilistic classification models. Classifiers employed by the waypoint location component 104 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence(class).

The waypoint location component 104 can include, in certain implementations, an inference component that can further enhance automated aspects of the waypoint location component 104 utilizing in part inference based schemes to facilitate identifying groups of annotations and/or waypoint locations within a 3D model. The waypoint location component 104 can employ any suitable machine-learning based techniques, statistical-based techniques and/or probabilistic-based techniques. For example, the waypoint location component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the waypoint location component 104 can perform a set of machine learning computations associated with identifying groups of annotations and/or waypoint locations within a 3D model. For example, the waypoint location component 104 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

In another embodiment, the waypoint location component 104 can determine the at least one waypoint location based on feedback data (e.g., user input data) provided by a remote user device. For example, the at least one waypoint location can be identified (e.g., manually identified) by a user (e.g., a user identity) via a rendering of the 3D model on a user interface of a remote user device. The user that identifies the at least one waypoint location can be, in one example, a user identity associated with the 3D model and/or a user identity that facilitates generation of the 3D model. The user can, for example, employ a 3D capturing device to capture 2D image data and/or depth data (e.g., to facilitate generation of the 3D model) at a physical location within the architectural environment that corresponds to the at least one waypoint location. In one example, the waypoint location component 104 can determine the at least one waypoint location based on selection data indicative of a selection of the at least one waypoint location by a user (e.g., a user identity) associated with the 3D model. Additionally, in certain implementations, user navigation behaviors within the 3D model can be captured, aggregated and/or employed by the waypoint location component 104 to identify and/or determine the at least one waypoint location.

The path component 106 can determine a path (e.g., a navigation path) within the 3D model to navigate between a first location associated with the 3D model and a second location associated with the 3D model based on the at least one waypoint location. The path component 106 can determine a path within the 3D model prior to rendering a 3D model on a remote client device. Alternatively, the path component 106 can determine a path within the 3D model during rendering of a 3D model on a remote client device. The first location can be, for example, a current position of viewpoint within the 3D model and the second location can be, for example, a destination position within the 3D model. The path component 106 can determine the path within the 3D model based on the at least one waypoint location. For example, a path determined by the path component 106 can include the at least one waypoint location. In one example, the at least one waypoint location can be an intermediate location between the first location and the second location. The path component 106 can also determine a path based on a sequence of waypoint locations between the first location and the second location. Multiple waypoint locations can guide formation of a path determined by the path component 106, where the path includes multiple paths that connect the multiple waypoint locations. Additionally, the path component 106 can determine the path based on a set of rules for the 3D model. For example, the set of rules can include predefined paths through a 3D model, a sequence of nodes to follow through a 3D model, etc. In certain implementations, the path component 106 can determine a set of paths between the first location and the second location that includes the path and one or more other paths. Collections of paths between different waypoint locations in the 3D modeled can be grouped together as a tour of the 3D model. A user viewing the 3D model on a remote client device can follow the set of paths in sequence. Additionally or alternatively, a user viewing the 3D model on a remote client device can proceed to any waypoint location along the set of paths. A user viewing the 3D model on a remote client device can additionally or alternatively proceed to one or more other locations within the 3D model that are not included in the set of paths.

In an aspect, in addition to employing the at least one waypoint location determined by the waypoint location component 104, the path component 106 can employ a pathfinding algorithm to determine an optimal path (e.g., an optimal travel path) between the first location and the second location. For example, the path component 106 can employ a pathfinding algorithm to determine an optimal path from the first location to the at least one waypoint location, and another optimal path from the at least one waypoint location to the second location. In one example, the path component 106 can employ a modified least-distance pathfinding algorithm to determine an optimal path from a set of paths through a network of nodes associated with the 3D model. The optimal path determined based on the pathfinding algorithm can be an unobstructed path through the 3D model that avoids objects (e.g., furniture such as tables, chairs, etc.) in the 3D model and/or provides smooth navigational transitions around corners and/or along steep vertical transitions in the 3D model.

In another aspect, the path component 106 can determine a path from the first location to the second location based on objects, architectural elements and/or user-defined location metadata between the first location and the second location. For example, the path component 106 can determine a portion of the 3D model that is associated with flooring of the architectural environment. The path component 106 can therefore determine a path from the first location to the second location based on the portion of the 3D model that is associated with flooring of the architectural environment. As such, a path determined by the path component 106 can be a clear path on a floor between nodes associated with the 3D model (e.g., a path determined by the path component 106 can avoid openings in floorings such as a stairwell railing or an area next to a balcony). For a path from the first location to the second location, the path component 106 can also determine a portion of the 3D model that is free of objects and/or architectural elements. For example, the path component 106 can determine visibility from a view location of a 3D model to a floor of the 3D model to avoid traveling through low obstacles such as furniture. As such, the path component 106 can determine a path based on physical connectivity and/or presence of obstacles in 3D data associated with the 3D model. The path component 106 can identify one or more opening areas of a 3D model, flat surface (e.g., floor) of a 3D model and/or other features of a 3D model to facilitate determination of a path from the first location to the second location. The path component 106 can identify one or more opening areas of a 3D model, flat surface (e.g., floor) of a 3D model and/or other features of a 3D model based on an iterative method (e.g., RANSAC) and/or a non-iterative method. A path determined by the path component 106 can additionally or alternatively be determined based on plane objects associated with the 3D model. For example, plane objects associated with the 3D model can be employed to define boundaries and/or open areas for the path from the first location to the second location.

The output component 108 can transmit navigation data (e.g., NAVIGATION DATA shown in FIG. 1) to a remote client device. For example, the navigation data can be visual data indicative of 2D data and/or 3D data of the 3D model along the path to simulate navigation of the path within the 3D model between the first location and the second location. The navigation data can also be processed 3D data (e.g., processed 3D-reconstructed data). The navigation data can include the at least one waypoint location determined by the waypoint location component 104 and/or one or more paths (e.g., one or more path geometries) determined by the path component 106. The navigation data can also provide a mapping of waypoint locations determined by the waypoint location component 104. For example, the navigation data can include connectivity data of the waypoint point locations that indicates how the waypoint locations are connected throughout the 3D model. Additionally or alternatively, the navigation data can include geometry data, texture data and/or mesh data for the 3D data of the 3D model along the path (e.g., a portion of the 3D model associated with the path). Additionally or alternatively, the navigation data can include user-defined location metadata. In one example, the navigation data can include a geometry of a path determined by the path component 106. In another example, the navigation data can include information regarding one or more nodes associated with a path determined by the path component 106. In yet another example, the navigation data can be associated with at least a start location along the path, the at least one waypoint location along the path, and an end location along the path. The 2D data can include, for example, panoramic imagery associated with the start location, the at least one waypoint location and/or the end location. The 3D data can include, for example, 3D model data associated with the start location, the at least one waypoint location and/or the end location. The remote client device can be configured to render and/or display a 3D model associated with the navigation data (e.g., via a 3D model viewer). The remote client device can simulate navigation of the path within the 3D model between the first location and the second location based on the navigation data. In an aspect, the output component 108 can transmit one or more data chunks associated with the navigation data to the remote client device. The one or more data chunks associated with the navigation data can be transmitted to the remote client device as a stream of data. In an embodiment, the 3D model can be rendered on the remote client device. The navigation data can be employed to determine a transmission order (e.g., a defined transmission order) for streaming at least a portion of the 2D data and/or 3D data to the remote client device. In one example, the navigation data can be transmitted to the remote client device. In another example, the navigation data can be determined locally on the remote client device. In another embodiment, the output component 108 can transmit, to the remote client device, 2D data indicative of a panorama view from a start location, an end location and at least one waypoint location along the path. Additionally or alternatively, the output component 108 can transmit a textured 3D model to the remote client device. The remote client device can then employ one or more rendering techniques to interpolate views along the path. The remote client device can render view along the path, for example, using a mixture of 3D model data and panoramic imagery from a start location, an end location and at least one waypoint location along the path.

While FIG. 1 depicts separate components in system 100, it is to be appreciated that the components may be implemented in a common component. In one example, the waypoint location component 104, the path component 106 and/or the output component 108 can be included in a single component. Further, it can be appreciated that the design of system 100 can include other component selections, component placements, etc., to facilitate navigation through a 3D model of an architectural environment.

It is to be appreciated that technical features of the navigation component 102 are highly technical in nature and not abstract ideas. Processing threads of the navigation component 102 that process and/or analyze 3D data, determine waypoint locations within a 3D model, determine a navigation path through a 3D model, transmit 3D data to a remote client device, etc. cannot be performed by a human (e.g., are greater than the capability of a single human mind). For example, the amount of the captured 3D data processed and/or analyzed, the speed of processing and/or analyzing of the captured 3D data, and/or the data types of the captured 3D data processed and/or analyzed by the navigation component 102 over a certain period of time can be respectively greater, faster and different than the amount, speed and data type that can be processed by a single human mind over the same period of time. Furthermore, the captured 3D data processed and/or analyzed by the navigation component 102 is 3D data generated by sensors of a 3D capturing device. Moreover, the navigation component 102 can be fully operational towards performing one or more other functions (e.g., fully powered on, fully executed, etc.) while also processing and/or analyzing the captured 3D data.

Figure 2:
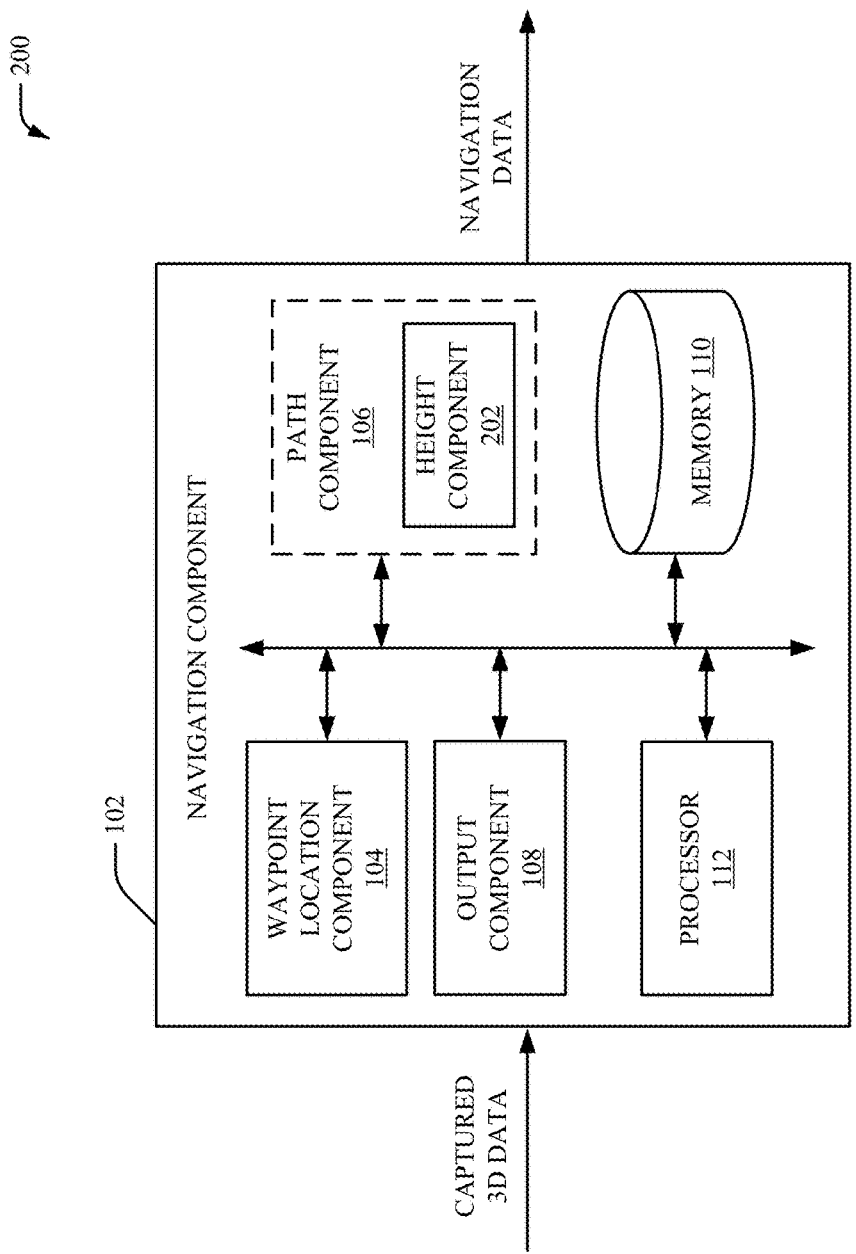
FIG. 2 illustrates a high-level block diagram of another example navigation component for determining and/or generating a navigation path through a 3D model, in accordance with various aspects and implementations described herein.

Referring to FIG. 2, there is illustrated a non-limiting implementation of a system 200 in accordance with various aspects and implementations of this disclosure. The system 200 includes the navigation component 102. The navigation component 102 can include the waypoint location component 104, the path component 106 and/or the output component 108. The path component 106 can include a height component 202. The height component 202 can manage a height perspective of a view associated with the path from the first location to the second location. For example, the height component 202 can vary height of a perspective of a view associated with a path determined by the path component 106. The view associated with the path determined by the path component 106 can be a view from a virtual camera associated with a rendering of a 3D model on a remote client device. As such, a height of a view of a path through a 3D model from the first location to the second location, as seen by a user on a remote client device, can be varied.

In a non-limiting example with respect to a stairwell associated with a 3D model of an architectural environment, the height component 202 can vary a height perspective of a virtual camera between a path defined by a first node location A along the stairwell, a second node location B along the stairwell, and a third node location C along the stairwell. Rather than determining a vertical distance of (AB+BC) equal to a distance AC, the height component 202 can determine a vertical distance of $(AB^e+BC^e)<AC^e$, where e is an exponent greater than one. Therefore, the height component 202 can determine a more gradual route for the path via the first node location A, the second node location B, and the third node location C (e.g., a more gradual route up or down the stairwell). Moreover, the height component 202 can provide a more natural feel to a rendering of a path defined by the path component 106 from a first location to a second location within a 3D model. In an aspect, the height component 202 can manage a height perspective of a view associated with the path from the first location to the second location based on a defined threshold level for the height perspective. For example, the height component 202 can limit variation of a height perspective between a first location and a second location within a 3D model to a range of height variations (e.g., the height component 202 can ensure that a height variation between a first location and a second location within a 3D model does not exceed a defined threshold level).

Figure 3:
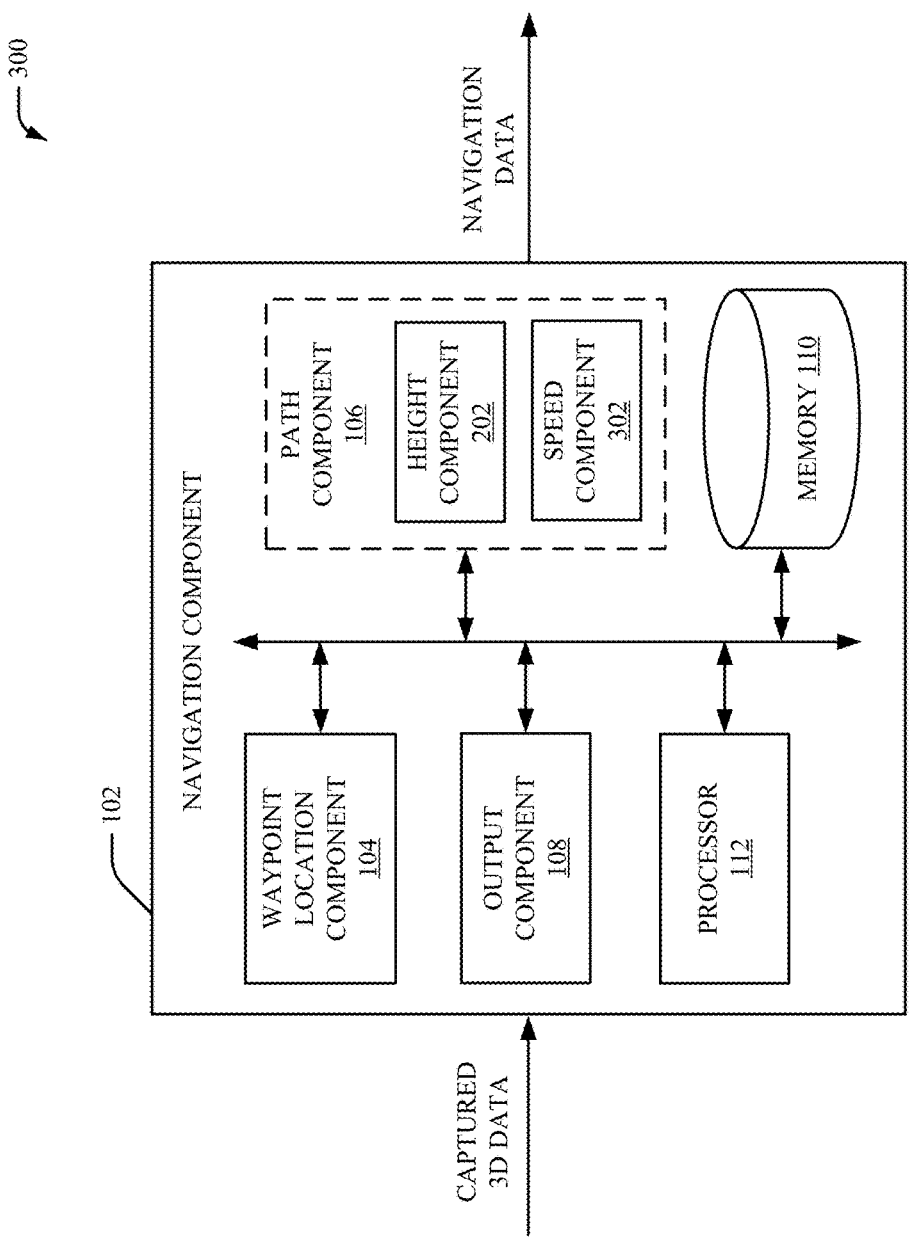
FIG. 3 illustrates a high-level block diagram of yet another example navigation component for determining and/or generating a navigation path through a 3D model, in accordance with various aspects and implementations described herein.

Referring to FIG. 3, there is illustrated a non-limiting implementation of a system 300 in accordance with various aspects and implementations of this disclosure. The system 300 includes the navigation component 102. The navigation component 102 can include the waypoint location component 104, the path component 106 and/or the output component 108. The path component 106 can include the height component 202 and/or a speed component 302. The speed component 302 can manage a speed perspective of a view associated with the path from the first location to the second location. For example, the speed component 302 can vary speed of a perspective of a view associated with a path determined by the path component 106. The view associated with the path determined by the path component 106 can be a view from a virtual camera associated with a rendering of a 3D model on a remote client device. As such, a speed of a view of a path through a 3D model from the first location to the second location, as seen by a user on a remote client device, can be varied. In an aspect, the speed component 302 can vary speed of a perspective of a view associated with a path determined by the path component 106 based on a distance between a first location of the path and a second location of the path. For example, if a distance between a first location of the path and a second location of a path is above a defined threshold level, the speed component 302 can increase speed of a perspective of a view associated with the path. In another aspect, the speed component 302 can vary speed of a perspective of a view associated with a path determined by the path component 106 based on a type of surface and/or an architecture feature associated with the path. For example, the speed component 302 can reduce speed of a perspective of a view when a path includes going up a stairwell, going down a stairwell, going up an inclined surface, going down an inclined surface, etc. In another example, the speed component 302 can reduce speed of a perspective of a view when a path turns around a corner of a wall included in a 3D model or when viewing a particular object within the 3D model. Therefore, the speed component 302 can facilitate generation of smooth turns when a path turns around a corner of a wall included in a 3D model or when viewing a particular object within the 3D model. In yet another example, the speed component 302 can increase a speed of a perspective of a view when a path moves through areas of low data density or visual fidelity within a 3D space. The speed component 302 can vary speed of a perspective of a view associated with a path determined by the path component 106, for example, by varying acceleration, deceleration and/or top speed parameters for traversal along the path. In one example, the speed component 302 can accelerate and/or decelerate a speed of a perspective of a view at a start of a path transition and/or at an end of a path transition associated with a path through a 3D model. For example, when a path associated with a 3D model begins, a perspective of a view of the path can accelerate. Then, when the path associated with the 3D model ends, the perspective of the view of the path can decelerate.

Figure 4:
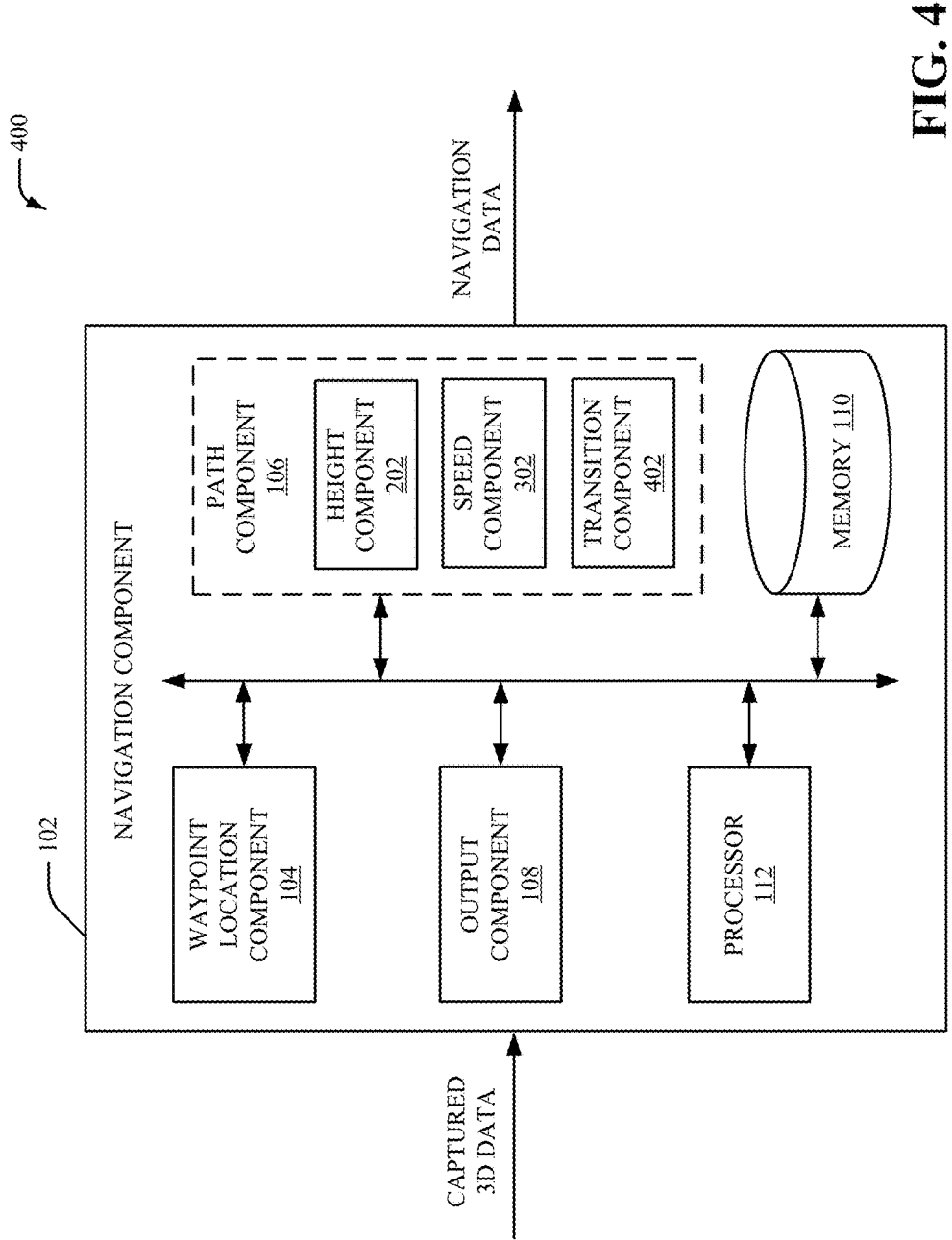
FIG. 4 illustrates a high-level block diagram of yet another example navigation component for determining and/or generating a navigation path through a 3D model, in accordance with various aspects and implementations described herein.

Referring to FIG. 4, there is illustrated a non-limiting implementation of a system 400 in accordance with various aspects and implementations of this disclosure. The system 400 includes the navigation component 102. The navigation component 102 can include the waypoint location component 104, the path component 106 and/or the output component 108. The path component 106 can include the height component 202, the speed component 302 and/or a transition component 402. The transition component 402 can manage transitions of views and/or 3D data for a path determined by the path component 106. For example, the transition component 402 can manage transitions of views and/or 3D data for a path within a 3D model displayed on a remote client device. A transition can be, for example, an animated transition between locations within the 3D model and/or included in a path defined by the path component 106. The transition component 402 can also employ data from the height component 202 and/or the speed component 302 to manage transitions of views and/or 3D data for a path determined by the path component 106. A transition for a path can be, for example, a walking-style transition between connected nodes in a 3D model when a path is rendered as a first-person view in an architectural environment, a cinematic-edit-style transition between nodes in a 3D model associated with disconnected graph (e.g., disconnected locations within a 3D mode), a smooth flying-style transitions when a path is rendered after an external view is rendered (e.g., when moving in or out of external views associated with a 3D model), a warp transition within the connected network of nodes that approximately follows locations and/or proportions of an original path location, or another type of transition within a 3D model.

A transition generated by the transition component 402 can be varied based on a distance between locations within the 3D model. For example, if a distance between a first location and a second location for a path within a 3D model is below a defined threshold level (e.g., a short distance is between the first location and the second location, the first location and the second location are direct neighbors in a series of locations, the first location and the second location separated by a single location in a series of locations, the first location and the second location are located on a corresponding floor level of a 3D model, etc.), a particular transition can be selected from a set of transitions managed by the transition component 402. In a non-limiting example, as a transition leaves a first panorama location, the transition component 402 can replace panorama data for the first panorama location with a 3D support mesh that is modeled and textured at a lower resolution than the panorama data. When a virtual camera approaches a second panorama destination, the transition component 404 can smoothly integrate a new photographic panorama into a corresponding 3D scene so that when a transition is complete full photorealism is restored. The virtual camera can then be pivoted to recreate any view direction defined during a 3D reconstruction process. In an example where a rendering of a 3D model transitions to an outside view external to the 3D model, the transition component 402 can smoothly transition a virtual camera to the defined location and orientation in a corresponding 3D space and the transition component 402 can apply mesh texturing when the external view is rendered. In another example associated with a disconnected portion of a network of nodes within a 3D model, the transition component 402 can apply a cinematic-editing-style transition where a virtual camera begins to move and turn toward the disconnected portion, and then cinematically cuts or dissolves to smoothly arrive at the disconnected portion (e.g., a cinematic-editing-style transition can be a transition where beginning and end motions are smoothly overlapped but travel through intermediary space is not shown).

In an embodiment, for a transition generated by the transition component 402 that does not follow an available direct path or a transition generated by the transition component 402 that is generated based on user preferences, a "slideshow" transition technique can be employed by the transition component 402. The "slideshow" transition technique can include, for example, a panning effect and/or a zooming effect during viewing of a path associated with a 3D model. For example, the "slideshow" transition technique can include a fade out effect followed by a fade in effect when viewing a path associated with a 3D model. In one example, a camera of a 3D view can be smoothly moved and/or rotated by a defined distance (e.g., a short distance) away from a location associated with a 3D model and, in certain instances, accompanied by a fade out during movement along a path associated with the 3D model so that dimensionality of the 3D model and/or a spatial relationship between a first location and a second location within the 3D model is expressed when viewing the 3D model. In another example, the transition component 402 can facilitate a smooth 3D movement that decelerates as new imagery at a new location (e.g., a waypoint location) of the 3D model fades in when viewing the 3D model. In an aspect, these "slideshow" transitions may be between start and end locations, and may include stops at a series of waypoint locations. For example, a series of slideshow transitions may start at a start point location, fade out while smoothly moving a defined distance away, then fade into a new location while smoothly moving a defined distance ending in the position of a first waypoint location. This series of fade out/fade in transitions may continue as the user is moved between the series of waypoint locations, and, in certain implementations, with rotation while positioned at each waypoint location. The series of transitions can then end at the end point location.

Figure 5:
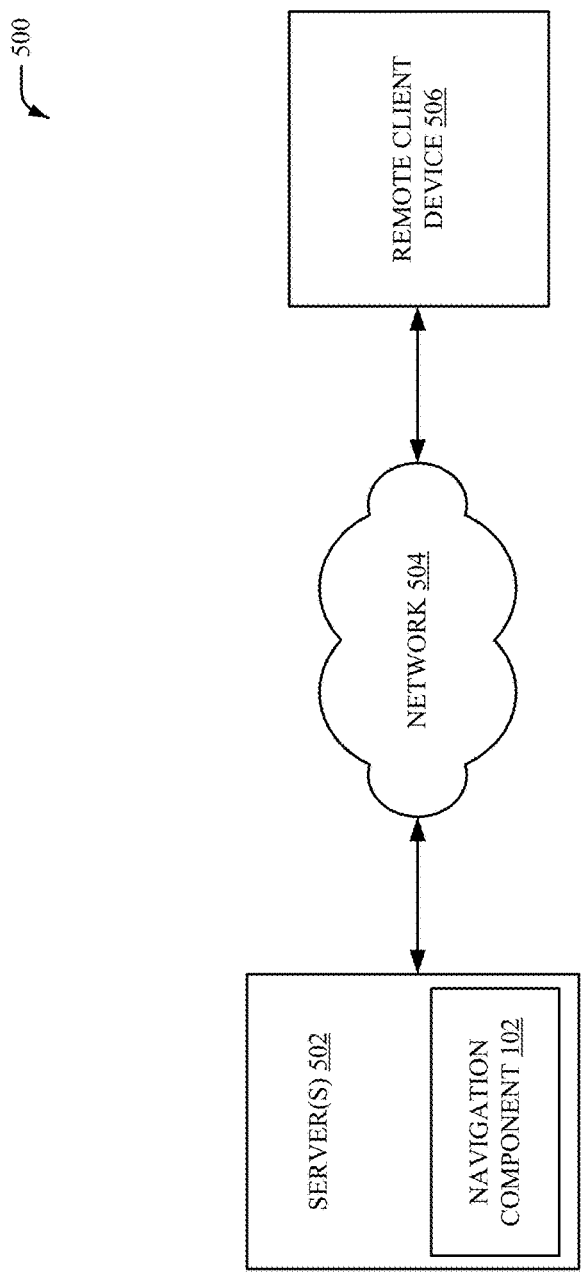
FIG. 5 illustrates a high-level block diagram of a system implementing a navigation component, in accordance with various aspects and implementations described herein.

Referring to FIG. 5, there is illustrated a non-limiting implementation of a system 500 in accordance with various aspects and implementations of this disclosure. The system 500 includes at least one server 502, a network 504 and a remote client device 506. The at least one server 502 can include at least the navigation component 102. The navigation component 102 can include the waypoint location component 104, the path component 106, the output component 108, the height component 202, the speed component 302 and/or the transition component 402, each of which can respectively function as more fully disclosed herein.

The remote client device 506 can be configured to receive 3D data to render and/or display a 3D model and/or the navigation data provided by the navigation component 102. A 3D model and/or the navigation data provided by the navigation component 102 can be displayed on the remote client device 506 via a model viewer. In an aspect, the at least one server 502 can be associated with a 3D reconstruction system. In another aspect, the remote client device 506 can be associated with a user (e.g., a user identity, etc.). The remote client device 506 can provide feedback data and/or user input data associated with a user (e.g., a user identity) to the server 502. In certain embodiments, the remote client device 506 can include, but is not limited to, a cellular phone (e.g., a smart phone), a tablet, a personal computer (PC), a desktop computer, a laptop computer, a camera, a 3D capturing device, another portable computing device, etc. The at least one server 502 can be communicably coupled to the remote client device 506 via the network 504. The network 504 can include one or more networks. For example, network 504 can include one or more wireless networks and/or one or more wired networks, including but not limited to, a cellular network, a wide area network (WAN, e.g., the Internet), a local area network (LAN) and/or a personal area network (PAN). In an example, the at least one server 502 can transmit data for a 3D model and/or the navigation data to the remote client device 506 via the network 504. As such, the remote client device 506 can receive a 3D model and/or a floorplan via virtually any desired wireless or wired technology, including, for example, cellular, WAN, WiFi, etc. In an aspect, at least one component of the navigation component 102 can be implemented on the remote client device 506 rather than the at least one server 502. For example, the output component 108 can be implemented on the remote client device 506 in certain implementations. As such, data for a 3D model and/or the navigation data can be pre-rendered (e.g., when the output component 108 is implemented on the at least one server 502), or a 3D model and/or the navigation data can be rendered in real-time (e.g., when the output component 108 is implemented on the remote client device 506).

Figure 6:
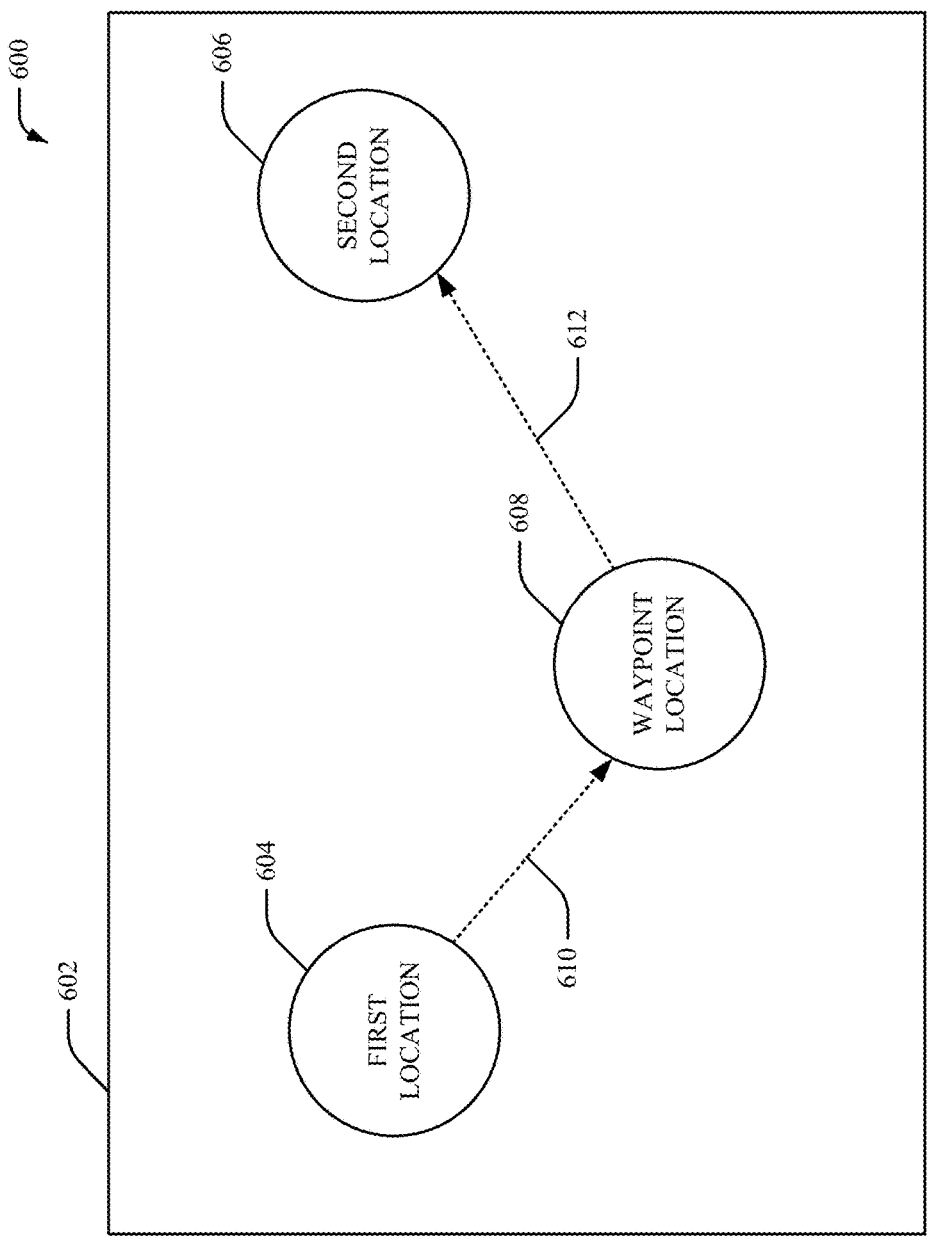
FIG. 6 illustrates an example 3D model with a navigation path, in accordance with various aspects and implementations described herein.

Referring now to FIG. 6, there is illustrated a non-limiting implementation of a system 600 in accordance with various aspects and implementations of this disclosure. The system 600 includes a 3D model 602. The 3D model 602 can be a 3D model of an architectural environment (e.g., an indoor architectural environment and/or an outdoor architectural environment). For example, the 3D model 602 can be a 3D model of a real-world location (e.g., a house, an apartment, a construction site, an office space, a commercial space, another living space, another working space, etc.). The 3D model 602 can include surfaces and/or contents of the real-world location. The 3D model 602, however, is not a two-dimensional computed aided design (CAD) drawing of a real-world location. On the contrary, the 3D model 602 is a model of an existing structure generated based on captured 3D data of the structure via a 3D capturing device. A 3D reconstruction system can employ 2D image data and/or depth data captured from 3D sensors (e.g., laser scanners, structured light systems, time-of-flight systems, etc.) of the 3D capturing device to generate the 3D model 602. The 3D model 602 can include geometry data of a 3D mesh, including but not limited to polygons, triangles, quads, and/or n-gons, or non-uniform rational basis splines (NURBS). As shown by the non-limiting implementation of the system 600 in FIG. 6, the 3D model 602 includes a first location 604 within the 3D model 602, a second location 606 within the 3D model 602, and a waypoint location 608 within the 3D model 602. In one example, the first location 604, the second location 606, and the waypoint location 608 can represent physical locations within an architectural environment represented by the 3D model 602. In another example, the first location 604, the second location 606, and the waypoint location 608 can represent node locations of the 3D model 602. The first location 604 can be, for example, a current position of viewpoint within the 3D model 602 and the second location 606 can be, for example, a destination position within the 3D model 602. In yet another example, the first location 604, the second location 606, and the waypoint location 608 can be associated with a virtual tour that employs the waypoint location 608 to optimize at least a portion of a path defined by the first location 604, the second location 606, and the waypoint location 608.

In an aspect, the waypoint location component 104 can determine the waypoint location 608. The waypoint location component 104 can determine the waypoint location 608 based on data provided by a user identity that manages the 3D model 602. For example, the waypoint location 608 can correspond to a capture point associated with the 3D capture device that captures 2D image data and/or depth data from the waypoint location 608. In another example, the waypoint location 608 can correspond to a snapshot location associated with a virtual camera within the 3D model. For example, a snapshot location can be a location where a user positions a 3D rendering engine at a particular location in a 3D model and defines a view from the snapshot location as a waypoint location. In certain implementations, the waypoint location 608 can be associated with a defined view direction. For example, when a portion of the 3D model that corresponds to the waypoint location 608 is rendered on a remote user device, a view direction and/or 3D data of the 3D model as selected by the user identity and/or as determined by the waypoint location component 104 can be presented on the remote user device. The path component 106 can determine a path within the 3D model 602 to navigate between the first location 604 and the second location 606 based on the waypoint location 608. For example, a path between the first location 604 and the second location 606 can include a first path 610 (e.g., a path between the first location 604 and the waypoint location 608) and a second path 612 (e.g., a path between the waypoint location 608 and the first location 604). As such, the waypoint location 608 can be an intermediate location and/or a stopping point between the first location 604 and the second location 606. It is to be appreciated that a path between the first location 604 and the second location 606 using the first path 610 and the second path 612 is not necessarily a shortest distance between the first location 604 and the second location 606. However, the waypoint location 608 can define at least a portion of a path between the first location 604 and the second location 606 for improved viewing experience of the 3D model 602.

Figure 7:
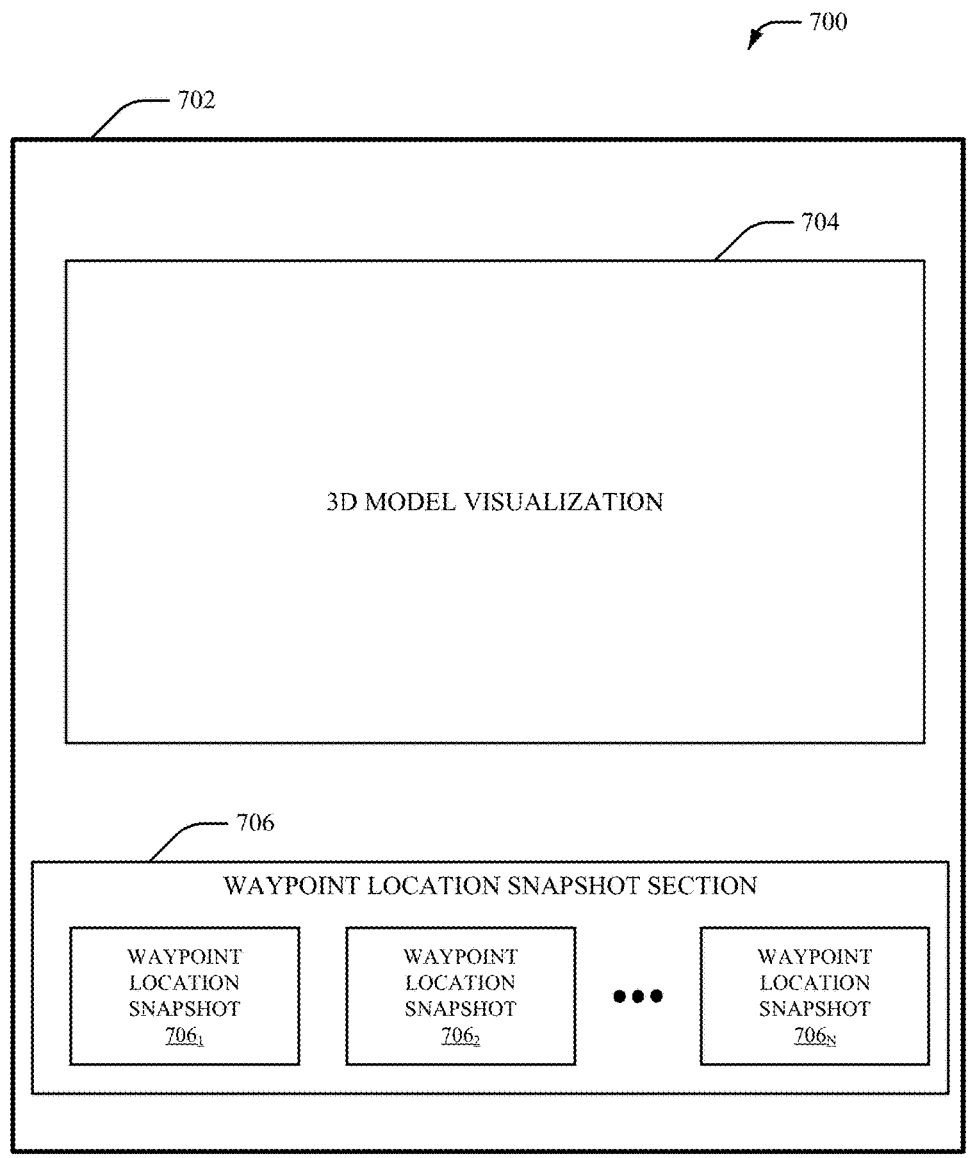
FIG. 7 illustrates an example user interface for a remote client device, in accordance with various aspects and implementations described herein.

Referring to FIG. 7, there is illustrated a non-limiting implementation of a system 700 in accordance with various aspects and implementations of this disclosure. In an aspect, the system 700 can be associated with a user device such as, for example, a computing device, a computer, a desktop computer, a laptop computer, a monitor device, a smart device, a smart phone, a mobile device, a handheld device, a tablet, a portable computing device or another type of user device associated with a display. The system 700 illustrates an example user interface 702. The user interface 702 can be a graphical user interface that presents a 3D model visualization section 704 associated with a rendered 3D model. For example, the 3D model visualization section 704 of the user interface 702 can present 3D data (e.g., 3D data associated with a 3D model of an architectural environment) and/or navigation data provided by the output component 108. As such, a user can view and/or interact with a 3D model along a navigation path via the 3D model visualization section 704.

The user interface 702 can also include a waypoint location snapshot section 706 associated with waypoint locations determined by a user. For example, waypoint location snapshots $706_{1-N}$ can correspond to thumbnail images of waypoint locations selected by a user via the 3D model visualization section 704 and/or a scanning process associated with a 3D reconstruction process. In one example, to designate the waypoint location snapshots $706_{1-N}$, a user can move a virtual camera associated with the 3D model visualization section 704 to the desired locations and view, and then perform an action to take a snapshot. Metadata for the waypoint location snapshots $706_{1-N}$ can be recorded into a 3D space model for the waypoint location snapshots $706_{1-N}$. Furthermore, the waypoint location snapshots $706_{1-N}$ corresponding to respective waypoint locations can facilitate designation of locations within a 3D model presented by the 3D model visualization section 704 that a user desires to highlight. The waypoint location snapshots $706_{1-N}$ can be associated with a path through a 3D model. The waypoint location snapshots $706_{1-N}$ can also be defined and/or ordered via the user interface 702 so that a viewer of a 3D model is directed to locations within the 3D model associated with the waypoint location snapshots $706_{1-N}$. The user interface 702 can also allow a user to specify transitions for the waypoint location snapshots $706_{1-N}$. For example, as an option for a tour associated with the waypoint location snapshots $706_{1-N}$, a user can specify a type of transition, an appearance and/or timing for transitions associated with the waypoint location snapshots $706_{1-N}$. The user interface 702 can also include editing tools to allow a user to define and/or control annotations associated with the waypoint location snapshots $706_{1-N}$ and/or waypoint locations within a 3D model. It is to be appreciated that the user interface 702 is merely an example. Therefore, the location and/or content of the 3D model visualization section 704 and/or the waypoint location snapshot section 706 can be varied. Furthermore, the user interface 702 can include other features, content and/or functionalities not shown in FIG. 7.

Figure 8:
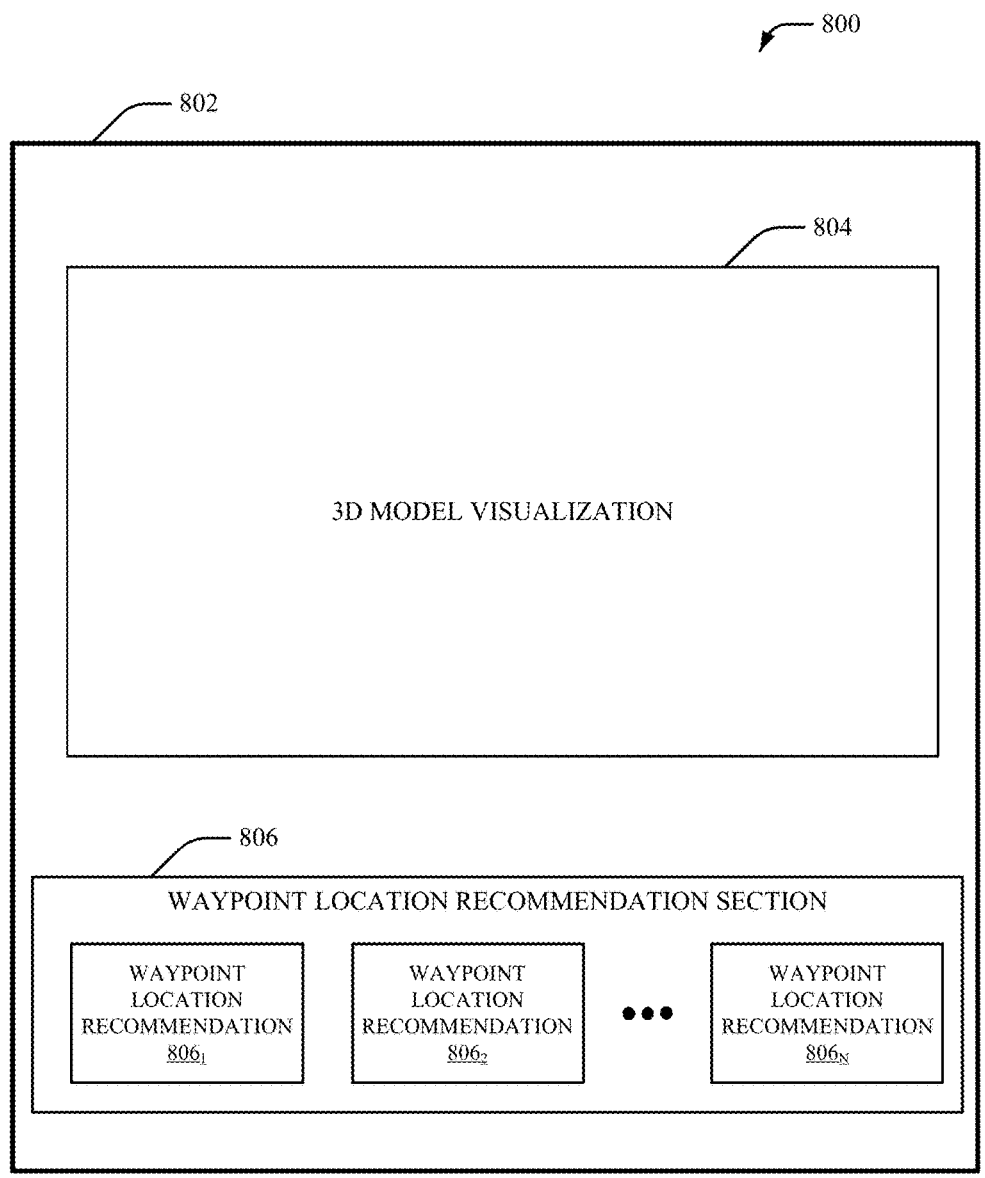
FIG. 8 illustrates another example user interface for a remote client device, in accordance with various aspects and implementations described herein.

Referring to FIG. 8, there is illustrated a non-limiting implementation of a system 800 in accordance with various aspects and implementations of this disclosure. In an aspect, the system 800 can be associated with a user device such as, for example, a computing device, a computer, a desktop computer, a laptop computer, a monitor device, a smart device, a smart phone, a mobile device, a handheld device, a tablet, a portable computing device or another type of user device associated with a display. The system 800 illustrates an example user interface 802. The user interface 802 can be a graphical user interface that presents a 3D model visualization section 804 associated with a rendered 3D model. For example, the 3D model visualization section 804 of the user interface 802 can present 3D data (e.g., 3D data associated with a 3D model of an architectural environment) and/or navigation data provided by the output component 108. As such, a user can view and/or interact with a 3D model along a navigation path via the 3D model visualization section 804.

The user interface 802 can also include a waypoint location recommendation section 806 associated with waypoint locations included in a 3D model rendered by the 3D model visualization section 804. For example, waypoint location recommendations $806_{1-N}$ can correspond to thumbnail images of waypoint locations included in a 3D model rendered by the 3D model visualization section 804. A user can preview and/or choose between a path through a 3D model based on the waypoint location recommendations $806_{1-N}$. For example, a user can select a set of waypoint locations and/or an ordered sequence of waypoint locations (e.g., that may define an order of a tour) via the waypoint location recommendations $806_{1-N}$. When a waypoint location recommendation from the waypoint location recommendations $806_{1-N}$ is selected by a user, a virtual camera associated with the 3D model visualization section 804 can transition along a path within a 3D model to a destination associated with the waypoint location recommendation. As such, the waypoint location recommendations $806_{1-N}$ can be still images of views from respective waypoint locations and/or the waypoint location recommendations $806_{1-N}$ can be presented as visual interface buttons to allow guidance and/or travel to highlighted locations within a 3D space rendered via the 3D model visualization section 804. As such, a user can pre-select and/or preview available path choices through a 3D model, as well as select and/or launch a navigation path through the 3D model. In one example, the 3D model visualization section 804 can present a video-player-like interface that provides an ability to navigate through the waypoint location recommendations $806_{1-N}$ in order, or to play a tour associated with the waypoint location recommendations $806_{1-N}$ as a timed performance. Therefore, a user can view a playback of a complete tour of a 3D model without the need for further interaction by the user (e.g., playback of the complete tour of the 3D model can be achieved via an autoplay tour mode). In an aspect, the waypoint location recommendations $806_{1-N}$ can be organized as a set of tours (e.g., a first group of the waypoint location recommendations $806_{1-N}$ can correspond to a first floor of an architectural environment, a second group of the waypoint location recommendations $806_{1-N}$ can correspond to a second floor of an architectural environment, etc.). It is to be appreciated that the user interface 802 is merely an example. Therefore, the location and/or content of the 3D model visualization section 804 and/or the waypoint location recommendation section 806 can be varied. Furthermore, the user interface 802 can include other features, content and/or functionalities not shown in FIG. 8.

Figure 9:
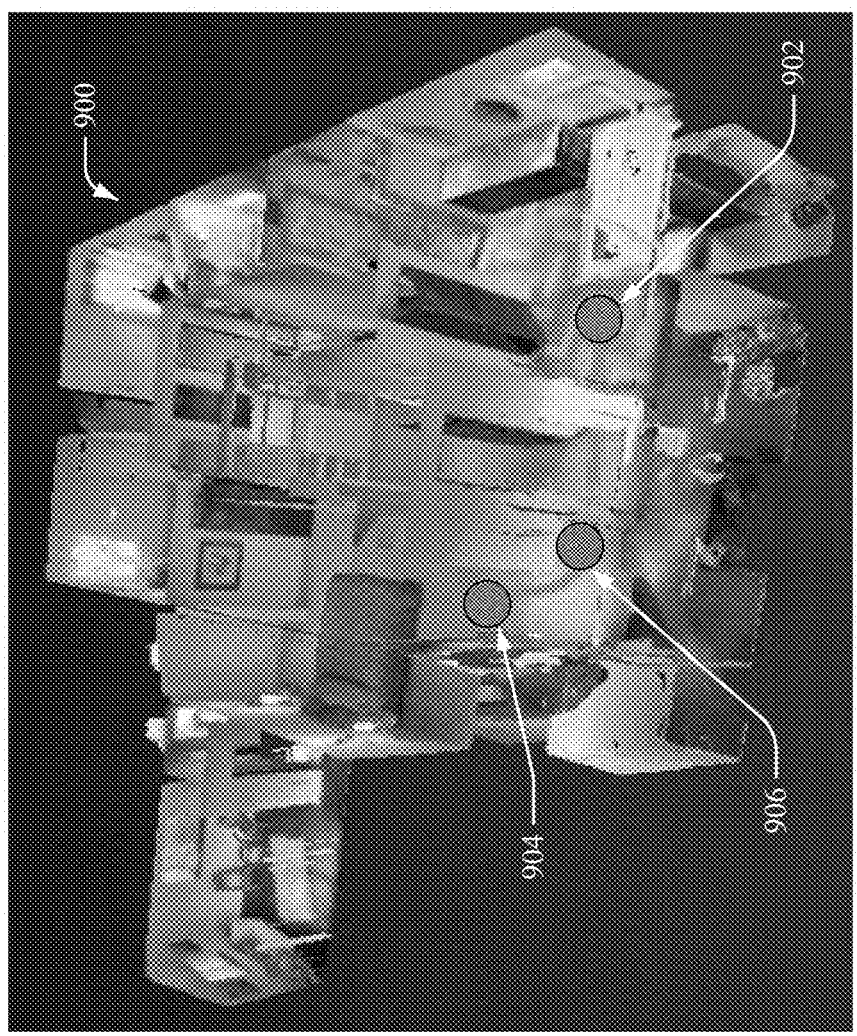
FIG. 9 depicts an example 3D model of a multi-story structure, in accordance with various aspects and implementations described herein.

FIG. 9 presents an example 3D model 900 of a multi-story structure in accordance with various aspects and embodiments disclosed herein. The 3D model 900 presents a 3D representation of an interior of a two story building with at least a portion of all the stories rendered. The 3D model 900 presents a perspective of the multi-story structure from the outside looking in certain parts removed (e.g., via backface culling), a view referred to herein as the orbit view. The 3D model 900 includes a first location 902, a second location 904, and a waypoint location 906. In one example, 3D data of the 3D model 900 can be generated by the output component 108 and/or the 3D model 900 can be presented via the 3D model visualization section 804 of the user interface 802. The waypoint location 906 can be determined by the waypoint location component 104. In an aspect, the first location 902, the second location 904 and/or the waypoint location 906 can be indicated by distinct visual markers within the 3D model. For example, the first location 902 can be associated with a first type of visual marker, the second location 904 can be associated with a second type of visual marker and/or the waypoint location 906 can be associated with a third type of visual marker. A path between the first location 902 and the second location 904 (e.g., in some instances via the waypoint location 906) can also be displayed via the 3D model 900. In an aspect, user navigation behaviors within the 3D model 900 can be captured, aggregated, and can be used to identify and suggest other waypoint locations to improve and/or refine the 3D model 900 and/or a 3D modeling system associated with the 3D model 900. In another aspect, the waypoint location 906 can be determined based on visibility of other defined locations in the 3D model 900, other defined view directions associated with the 3D model 900 and/or other annotations defined within the 3D model 900. The 3D model 900 can also include interactive elements, messages, visual media, web links and/or annotations (e.g., annotations provided by a user or fetched from one or more online databases). Interactive elements of non-waypoint annotations may be conditionally displayed either with a 3D view of the 3D model 900 or as additional 2D elements (e.g., sidebars, overlays, etc.) within an overall view of the 3D model. Annotations and/or interactive elements can be visible to a viewer based on spatial proximity of a virtual camera associated with the 3D model 900, type of 3D data, architecture structure and/or objects shown in a 3D scene view of the 3D model 900, and/or a location of the waypoint location 906.

Figure 10:
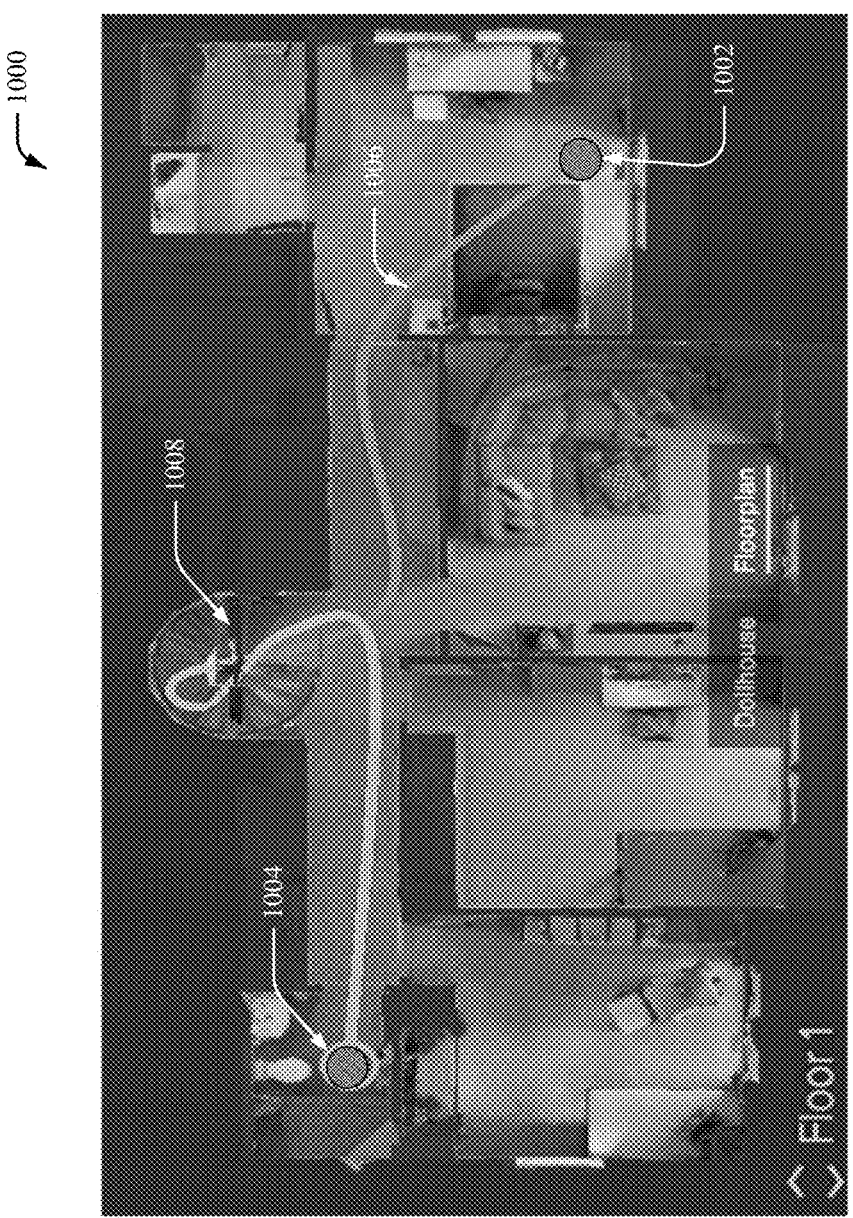
FIG. 10 depicts an example floorplan view of a 3D model, in accordance with various aspects and implementations described herein.

FIG. 10 presents a floorplan view 1000 of a 3D model. The floorplan view 1000 includes a first location 1002 at a second floor level of an architectural environment and a second location 1004 at a first floor level of the architectural environment. To reach the second location 1004, a path 1006 from the first location 1002 to the second location 1004 includes a stairwell 1008. The path 1006 can be a rendered path through the 3D model. When rendering a 3D view of the architectural environment shown in FIG. 10 along the path 1006, the speed component 302 can vary speed of a perspective of a view associated with the path 1006. For example, speed of a view from a virtual camera along the path 1006 can be decreased when ascending or descending the stairwell 1008 or mimic a natural walking motion up or down a stairwell. Furthermore, as seen by the floorplan view 1000, the path 1006 can reveal spatial relationships between different parts of a full 3D space shown by the floorplan view 1000.

Figure 11:
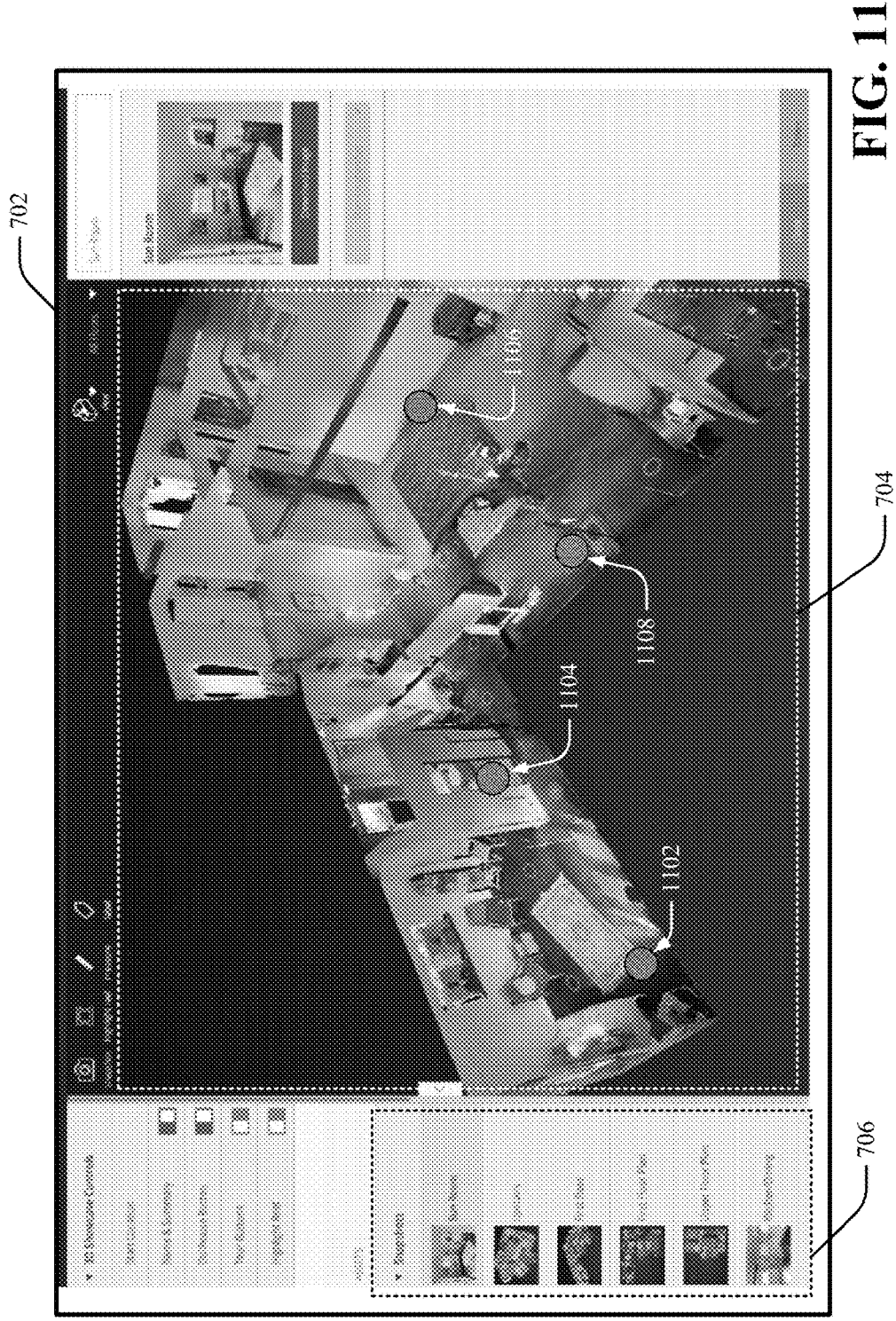
FIG. 11 depicts an example user interface, in accordance with various aspects and implementations described herein.

FIG. 11 presents an embodiment of the user interface 702 that includes the 3D model visualization section 704 and the waypoint location snapshot section 706. In the embodiment shown in FIG. 11, the 3D model visualization section 704 presents a 3D model of a multi-story structure and the waypoint location snapshot section 706 presents snapshots associated with different waypoint locations in the 3D model presented by the 3D model visualization section 704. In the embodiment shown in FIG. 11, the 3D model visualization section 704 also presents at least a first waypoint location 1102, a second waypoint location 1104, a third waypoint location 1106 and a fourth waypoint location 1108 that correspond to the snapshots presented by the waypoint location snapshot section 706. For example, the waypoint location snapshot section 706 can include a first waypoint location snapshot that corresponds to the first waypoint location 1102, a second waypoint location snapshot that corresponds to the second waypoint location 1104, a third waypoint location snapshot that corresponds to the third waypoint location 1106, and a fourth waypoint location snapshot that corresponds to the fourth waypoint location 1108. The first waypoint location 1102, the second waypoint location 1104, the third waypoint location 1106 and the fourth waypoint location 1108 can be defined by the waypoint location component 104. Furthermore, the first waypoint location 1102, the second waypoint location 1104, the third waypoint location 1106 and the fourth waypoint location 1108 can facilitate generation of a path (e.g., a navigation path) through a 3D model presented by the 3D model visualization section 704. In an aspect, the waypoint location snapshot section 706 can facilitate semantic ordering of a tour through the 3D model that includes the first waypoint location 1102, the second waypoint location 1104, the third waypoint location 1106 and the fourth waypoint location 1108. The semantic ordering of the first waypoint location 1102, the second waypoint location 1104, the third waypoint location 1106 and the fourth waypoint location 1108 can be determined based on geometric structure of a 3D space associated with the 3D model.

Figure 12:
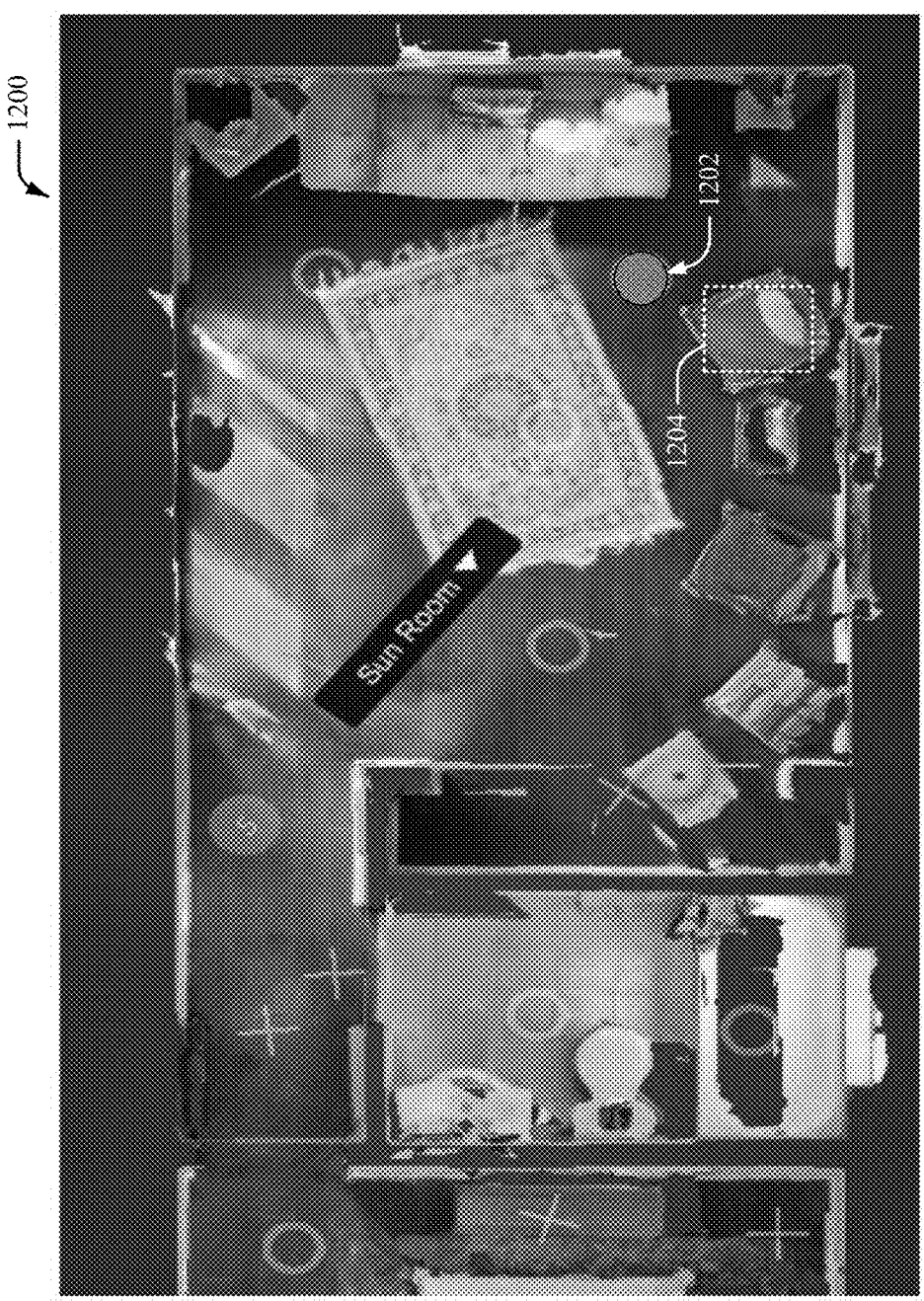
FIG. 12 depicts another example floorplan view of a 3D model, in accordance with various aspects and implementations described herein.

FIG. 12 presents a floorplan view 1200 of a 3D model. The floorplan view 1200 includes at least a waypoint location 1202. In an implementation, the waypoint location component 104 can determine the waypoint location 1202 based on identification of an object 1204 in the 3D model associated with the floorplan view 1200. For example, the object 1204 can be employed by the waypoint location component 104 to automatically determine the waypoint location 1202. In an aspect, the waypoint location component 104 can employ semantic information associated with the object 1204 to determine the waypoint location 1202. Content of an annotation associated with the object 1204 can be employed by the waypoint location component 104, for example, to determine, identify and/or suggest the waypoint location 1202.

Figure 13:
FIG. 13 depicts a view of a 3D model by a user via a remote client device, in accordance with various aspects and implementations described herein.

FIG. 13 presents a view 1300 of a 3D model by a user via a remote client device. The view 1300 includes a path 1302 through a 3D model of an architectural environment. The path 1302 can be a navigation path determined by the path component 106. Furthermore, the path 1302 can be displayed within the 3D model as a visually guided path. The view 1300 can be a view from a virtual camera with respect to the path 1302. A view from the virtual camera can be guided and/or moved along the path 1302 to view other portions of the 3D model of the architectural environment. In an aspect, the path 1302 can follow a set of waypoint locations to facilitate navigation through the 3D model of the architectural environment. In one example, the view 1300 can be a defined view (e.g., a defined viewpoint) from a waypoint location on the path 1302. In another example, path 1302 can be a path from a current location within the 3D model to a waypoint location within the 3D model. The path 1302 can curve to follow a floor of the architectural environment rendered by the 3D model, rather than or in addition to being a path that follows a transitioning camera view. The path 1302 can be a static object within the 3D model of the architectural environment. Alternatively, the path 1302 can include animated features (e.g., the path 1302 can indicate a direction of travel through the 3D model of the architectural environment). The path 1302 can also include semantic information such as, for example, an indication (e.g., a visual indication) that the path 1302 is moving to a new floor of the architectural environment rendered by the 3D model. In another aspect, the view 1300 can include a visual interface 1304 that allows a user to select a location or a waypoint on a tour through the 3D model of the architectural environment. In one example, the spatial ordering of images of locations in the visual interface 1304 can correspond to a temporal ordering of the series of locations in a virtual tour. The view 1300 can also provide a visual hint when a user is viewing the 3D model in a first-person style to allow a particular location of the 3D model to be temporarily viewed for a defined period of time. For example, a virtual camera can be momentarily redirected to the particular location before returning to an original location. A visual hint may also provide a view of an external location with respect to the 3D model. Furthermore, the view 1300 can include one or more on-screen interface elements to indicate a particular viewing direction for a user to view. The view 1300 can also allow a user to virtually take one step forward or one step backward along the path 1302. In an aspect, the various aforementioned views can be triggered by user input, for example, by selecting location images or additional user interface elements from the visual interface 1304.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 14:
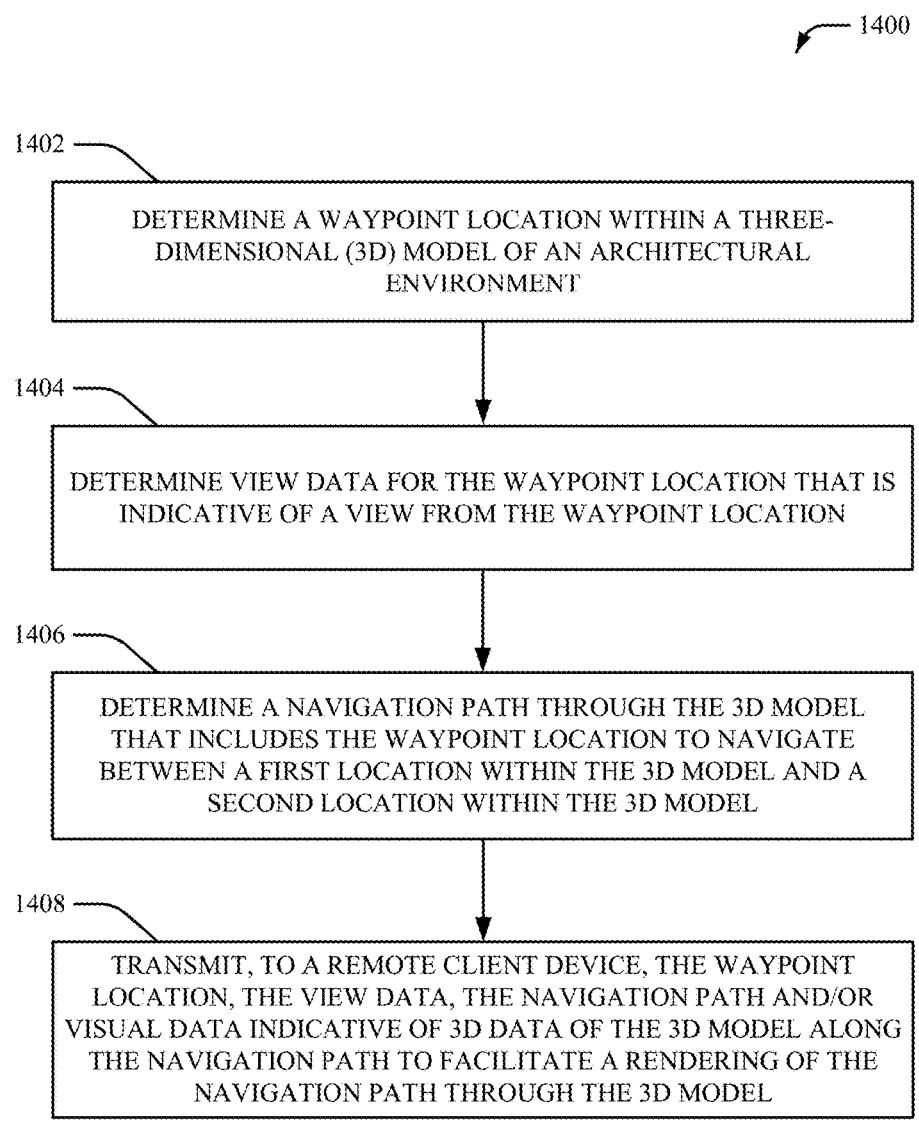
FIG. 14 depicts a flow diagram of an example method for determining and/or generating a navigation path through a 3D model, in accordance with various aspects and implementations described herein.

FIG. 14 illustrates a methodology and/or a flow diagram in accordance with the disclosed subject matter. For simplicity of explanation, the methodology is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodology in accordance with the disclosed subject matter. In addition, those skilled in the art will understand and appreciate that the methodology could alternatively be represented as a series of interrelated states via a state diagram or events. Additionally, it should be further appreciated that the methodology disclosed hereinafter and throughout this specification are capable of being stored on an article of manufacture to facilitate transporting and transferring such methodology to computers. The term article of manufacture, as used herein, is intended to encompass a computer program accessible from any computer-readable device or storage media.

Referring to FIG. 14, there illustrated is a methodology 1400 for determining and/or generating a navigation path through a 3D model, according to an aspect of the subject innovation. As an example, methodology 1400 can be utilized in various applications, such as, but not limited to, 3D modeling systems, 3D reconstruction systems, server systems, cloud-based systems, client-side systems, etc.

At 1402, a waypoint location within a three-dimensional (3D) model of an architectural environment is determined (e.g., by a waypoint location component 104). The waypoint location can be a location within the 3D model where a virtual camera view of the 3D model (e.g., a virtual camera that renders a view of the 3D model on a remote client device) stops during navigation through the 3D model. The waypoint location can be determined based on location data indicative of a location associated with a 3D capturing device (e.g., a 3D capturing device that captures 2D data and/or depth data associated with the waypoint location), object data indicative of an object included in the 3D model and/or semantic data associated with the 3D model. Additionally or alternatively, waypoint location can be determined based on a location within the 3D defined by a user via a user interface that renders and/or displays the 3D model.

At 1404, view data for the waypoint location that is indicative of a view from the waypoint location is determined (e.g., by a waypoint location component 104). The view data can be a view of a portion of the 3D model. The view data can be associated with a defined viewpoint direction for a virtual camera and/or a defined portion of the 3D model that forms a view for a virtual camera from the waypoint location. In one example, the visual data can be a set of projected 360-degree panorama photographic images embedded within a 3D mesh of the 3D model where the set of projected 360-degree panorama photographic images is projected via a virtual camera from the waypoint location within the 3D model. In another example, the visual data can be 360-degree photographic imagery derived from image data captured by a camera and associated with the waypoint location.

At 1406, a navigation path through the 3D model that includes the waypoint location to navigate between a first location within the 3D model and a second location within the 3D model is determined (e.g., by a path component 106). For example, the navigation path can be a path through the 3D model that includes the first location, the waypoint location and the second location. The waypoint location can be an intermediary location along the navigation path between the first location and the second location.

At 1408, the waypoint location, the view data, the navigation path and/or visual data indicative of 3D data of the 3D model along the navigation path is transmitted to a remote client device (e.g., by an output component 108) to facilitate a rendering of the navigation path through the 3D model. For example, navigation data can be transmitted to the remote client device. The navigation data can include the waypoint location and/or the navigation paths. The navigation data can also provide a mapping of the waypoint with respect to other determined waypoint locations. Additionally or alternatively, the navigation data can include geometry data, texture data and/or mesh data for the navigation path through the 3D model. In an aspect, the navigation data (e.g., the waypoint location, the view data, the navigation path and/or the visual data) can be transmitted to the remote client device via one or more data chunks. The remote client device can be configured to render and/or display a 3D model associated with the navigation path (e.g., via a 3D model viewer).

Figure 15:
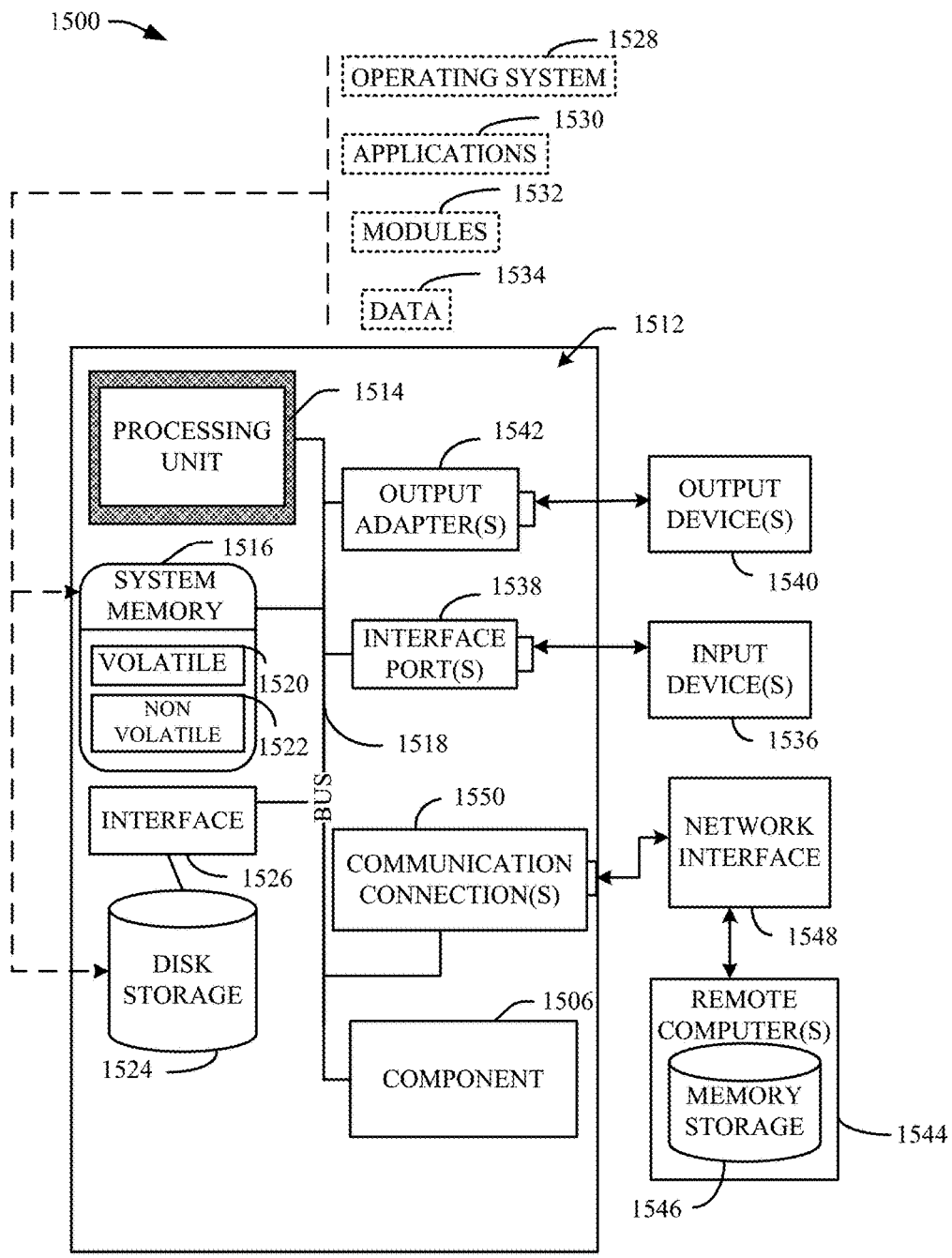
FIG. 15 is a schematic block diagram illustrating a suitable operating environment.
Figure 16:
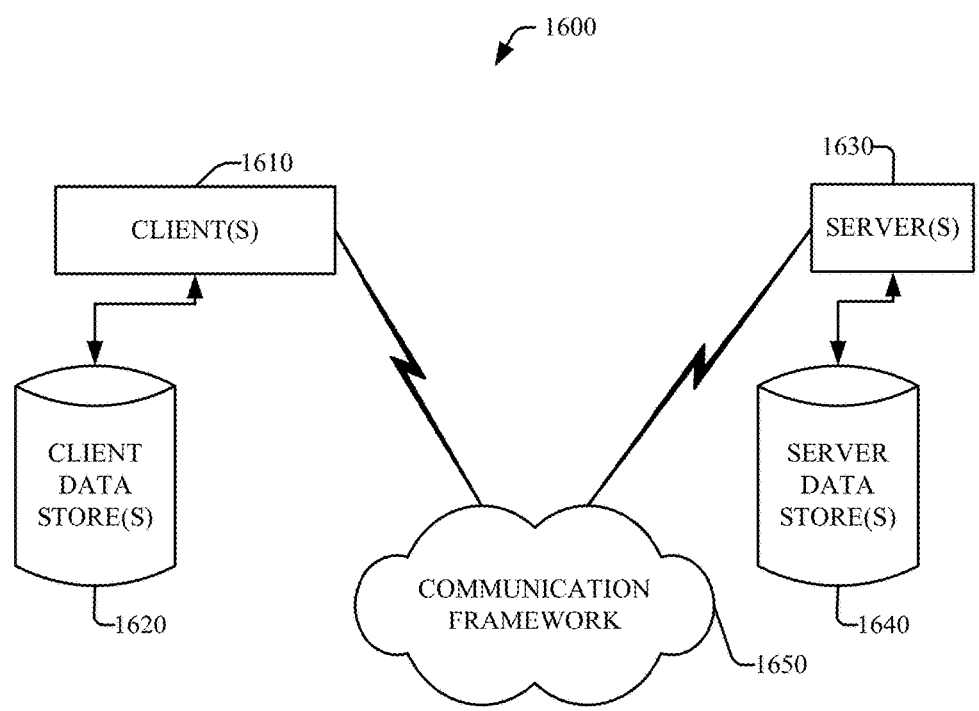
FIG. 16 is a schematic block diagram of a sample-computing environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, a suitable environment 1500 for implementing various aspects of this disclosure includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 also includes removable/non-removable, volatile/nonvolatile computer storage media. FIG. 15 illustrates, for example, a disk storage 1524. Disk storage 1524 includes, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

FIG. 15 also depicts software that acts as an intermediary between users and the basic computer resources described in the suitable operating environment 1500. Such software includes, for example, an operating system 1528. Operating system 1528, which can be stored on disk storage 1524, acts to control and allocate resources of the computer system 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

It is to be appreciated that the computer 1512 can be used in connection with implementing one or more of the systems, components and/or methodologies shown and described in connection with FIGS. 1-14. In accordance with various aspects and implementations, the computer 1512 can be used to facilitate determining and/or generating a navigation path through a 3D model. In certain exemplary embodiments, the computer 1512 includes a component 1506 (e.g., a navigation component 102) that can contain, for example, a waypoint location component 104, a path component 106, an output component 108, a height component 202, a speed component 302 and/or a transition component 402, each of which can respectively function as more fully disclosed herein. In an aspect, the component 1506 can be implemented in and/or in connection with the system memory 1516.

FIG. 16 is a schematic block diagram of a sample-computing environment 1600 with which the subject matter of this disclosure can interact. The system 1600 includes one or more client(s) 1610. The client(s) 1610 can be hardware and/or software (e.g., threads, processes, computing devices). The system 1600 also includes one or more server(s) 1630. Thus, system 1600 can correspond to a two-tier client server model or a multi-tier model (e.g., client, middle tier server, data server), amongst other models. The server(s) 1630 can also be hardware and/or software (e.g., threads, processes, computing devices). The servers 1630 can house threads to perform transformations by employing this disclosure, for example. One possible communication between a client 1610 and a server 1630 may be in the form of a data packet transmitted between two or more computer processes.

The system 1600 includes a communication framework 1650 that can be employed to facilitate communications between the client(s) 1610 and the server(s) 1630. The client(s) 1610 are operatively connected to one or more client data store(s) 1620 that can be employed to store information local to the client(s) 1610. Similarly, the server(s) 1630 are operatively connected to one or more server data store(s) 1640 that can be employed to store information local to the servers 1630.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2

(3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory storing computer executable components; and
a processor configured to execute the following computer executable components stored in the memory:
a waypoint location component that determines at least one waypoint location within a captured three-dimensional (3D) model of an architectural environment and virtual 3D view data for the at least one waypoint location that is indicative of a virtual 3D view from the at least one waypoint location;
a path component that determines a path within the captured 3D model to navigate between a first location associated with the captured 3D model and a second location associated with the captured 3D model based on the virtual 3D view data associated with the at least one waypoint location; and
an output component that transmits, to a remote client device, visual data indicative of two-dimensional (2D) data or 3D data of the captured 3D model along the path to simulate, via the remote client device, virtual navigation of the path within the captured 3D model between the first location and the second location.

2. The system of claim 1, wherein the waypoint location component determines the at least one waypoint location based on location data indicative of a location of a 3D capturing device that captures the virtual 3D view data.

3. The system of claim 1, wherein the waypoint location component determines the at least one waypoint location based on object data indicative of an object included in the captured 3D model.

4. The system of claim 1, wherein the waypoint location component determines the at least one waypoint location based on selection data indicative of a selection of the at least one waypoint location by a user identity associated with the captured 3D model.

5. The system of claim 1, wherein the path component determines a set of paths between the first location and the second location that includes the path and one or more other paths.

6. The system of claim 1, wherein the path component determines the path based on a sequence of waypoint locations between the first location and the second location.

7. The system of claim 1, wherein the path component determines the path based on a set of rules for the captured 3D model.

8. The system of claim 1, wherein the path component varies height of a view of the path that is rendered via the remote client device.

9. The system of claim 1, wherein the path component varies speed of a view of the path that is rendered via the remote client device.

10. A method, comprising:
employing a processor that facilitates execution of computer executable instructions stored on a non-transitory computer readable medium to implement operations, comprising:
determining a waypoint location within a three-dimensional (3D) model of an architectural environment and virtual 3D view data for the waypoint location that is indicative of a virtual 3D view from the waypoint location;
determining, based on the virtual 3D view data, a virtual navigation path through the 3D model that includes the waypoint location to navigate between a first location within the 3D model and a second location within the 3D model; and
transmitting, to a remote client device, visual data indicative of two-dimensional (2D) data or 3D data of the 3D model along the virtual navigation path to facilitate a rendering of the virtual navigation path through the 3D model.

11. The method of claim 10, wherein the determining the waypoint location comprises determining the waypoint location based on location data indicative of a location of a 3D capturing device that captures the virtual 3D view data.

12. The method of claim 10, wherein the determining the waypoint location comprises determining the waypoint location based on object data indicative of a location of an object included in the 3D model.

13. The method of claim 10, wherein the determining the waypoint location comprises determining the waypoint location based on feedback data indicative of a location within the 3D model for the waypoint location.

14. The method of claim 10, wherein the determining the virtual navigation path comprises determining a set of virtual navigation paths between the first location and the second location that includes the virtual navigation path and one or more other virtual navigation paths.

15. The method of claim 10, wherein the determining the virtual navigation path comprises determining the virtual navigation path based on a sequence of waypoint locations between the first location and the second location.

16. The method of claim 10, wherein the determining the virtual navigation path comprises determining the virtual navigation path based on a defined virtual navigation path.

17. The method of claim 10, wherein the transmitting the visual data comprises transmitting panoramic imagery associated with the at least one waypoint location.

18. A computer readable storage device comprising instructions that, in response to execution, cause a system comprising a processor to perform operations, comprising:

determining a first location within a three-dimensional (3D) model of an architectural environment and virtual view data for the first location that is indicative of a virtual view from the first location;

determining, based on the virtual view data, a virtual navigation path between a second location within the 3D model and a third location within the 3D model, the virtual navigation path comprising the first location, the second location and the third location; and transmitting data associated with the virtual navigation path to a remote client device.

19. The computer readable storage device of claim 18, wherein the determining the first location comprises determining the first location based on semantic information associated with the 3D model.

20. The computer readable storage device of claim 18, wherein the determining the first location comprises determining the first location based on a fourth location within the 3D model that is associated with an object.

* * * * *